(12) United States Patent
Matsuoka

(10) Patent No.: US 10,076,996 B2
(45) Date of Patent: Sep. 18, 2018

(54) LIGHT APPARATUS FOR POWER-RECEIVING CONNECTOR

(71) Applicant: TOYODA GOSEI CO., LTD., Kiyosu-shi (JP)

(72) Inventor: Yoichi Matsuoka, Kiyosu (JP)

(73) Assignee: TOYODA GOSEI CO., LTD., Kiyosu-Shi, Aichi-Ken (JP)

(*) Notice: Subject to any disclaimer, the term of this patent is extended or adjusted under 35 U.S.C. 154(b) by 105 days.

(21) Appl. No.: 15/235,002

(22) Filed: Aug. 11, 2016

(65) Prior Publication Data

US 2017/0080851 A1    Mar. 23, 2017

(30) Foreign Application Priority Data

Sep. 23, 2015  (JP) .................................. 2015-186187
Sep. 24, 2015  (JP) .................................. 2015-186571
Sep. 25, 2015  (JP) .................................. 2015-188051

(51) Int. Cl.
*B60L 11/00* (2006.01)
*F21V 3/02* (2006.01)
(Continued)

(52) U.S. Cl.
CPC ........ *B60Q 1/2661* (2013.01); *B60L 11/1818* (2013.01); *F21V 3/02* (2013.01); *F21V 31/00* (2013.01); *F21Y 2115/10* (2016.08)

(58) Field of Classification Search
CPC ... B60L 11/1818; B60Q 1/2661; F21V 31/00; F21V 3/02; F21Y 2115/10
See application file for complete search history.

(56) References Cited

U.S. PATENT DOCUMENTS

| 4,385,345 A | 5/1983 | Freudenreich et al. |
| 9,132,740 B2 * | 9/2015 | Grider ................. B60L 11/1816 |

(Continued)

FOREIGN PATENT DOCUMENTS

| JP | S 56-126202 S | 10/1981 |
| JP | 2004-148923 A | 5/2004 |

(Continued)

OTHER PUBLICATIONS

Japanese Office Action dated Jul. 24, 2018 in corresponding Japanese Application No. 2015-186571 with a JPO website computer-generated English translation thereof.

*Primary Examiner* — Peggy Neils
(74) *Attorney, Agent, or Firm* — McGinn I.P. Law Group PPLC

(57) ABSTRACT

Disclosed is a lighting apparatus for power-receiving connector. The power-receiving connector includes a power-receiving accommodation chamber, and a power-receiving unit. The lighting apparatus is disposed on an accommodation bottom face in the power-receiving accommodation chamber, and includes a lighting cover. The lighting cover has a cover top face opposing the accommodation bottom face, and a cover side face disposed between the accommodation bottom face and the cover top face and inclining so as to overhang from the cover top face toward the accommodation bottom face. The cover side face includes a first emission portion directed to a vehicular lower side, and a second emission portion directed to a vehicular lateral side. A first elevation angle exhibited by the first emission portion to the accommodation bottom face is smaller than a second elevation angle exhibited by the second emission portion to the accommodation bottom face.

8 Claims, 8 Drawing Sheets

(51) Int. Cl.
*B60Q 1/26* (2006.01)
*F21V 31/00* (2006.01)
*B60L 11/18* (2006.01)
*F21Y 115/10* (2016.01)

(56) References Cited

U.S. PATENT DOCUMENTS

| | | |
|---|---|---|
| 9,197,072 B2 | 11/2015 | Umeda et al. |
| 9,248,750 B2 * | 2/2016 | Shen ................ H02J 7/0044 |
| 2012/0212967 A1 | 8/2012 | Sawayanagi |

FOREIGN PATENT DOCUMENTS

| | | | |
|---|---|---|---|
| JP | 2012-171441 A | 9/2012 | |
| JP | S 52-63382 B2 | 8/2013 | |
| JP | 5582130 B2 | 9/2014 | |
| JP | 5684600 B2 | 3/2015 | |
| WO | WO2015/110445 | * 7/2015 | .............. B60L 11/18 |

* cited by examiner

Prior Art

Prior Art

LIGHT APPARATUS FOR POWER-RECEIVING CONNECTOR

INCORPORATION BY REFERENCE

The present invention is based on Japanese Patent Application No. 2015-186187, filed on Sep. 23, 2015, Japanese Patent Application No. 2015-186571, filed on Sep. 24, 2015, and Japanese Patent Application No. 2015-188051, filed on Sep. 25, 2015, the entire contents of which are incorporated herein by reference.

BACKGROUND OF THE INVENTION

Field of the Invention

The present invention relates to a lighting apparatus designed for power-receiving connectors for charging on-board batteries in vehicles.

Description of the Related Art

Vehicles, such as automobiles, are provided with lighting apparatuses disposed at various locations. For example, in an electric automobile or a hybrid automobile, a lighting apparatus is disposed in the neighborhood of a charging connector, which operates to charge the batteries, in order to illuminate an operator at his or her hands or feet. The charging connector comprises a power-feeding-side connector, and a power-receiving-side connector (i.e., a vehicle-side inlet).

Japanese Patent Gazette No. 5582130 discloses a lighting apparatus that is designed for the power-receiving-side connector. The lighting apparatus comprises a charging port, an accommodation dent, a connector (i.e., the power-receiving-side connector) for charging, and a light source for illumination. The charging port is arranged in the outer face of an automotive body. The accommodation dent is formed inside the charging port. The charging connector is arranged inside the accommodation dent. The illumination light source is buried at the upper circumferential wall in the accommodation dent. Moreover, the illumination light source emits a light, which is directed from the upper circumferential wall of the accommodation dent toward the lower side, to illuminate the charging connector (i.e., the power-receiving-side connector) or an operator at his or her feet.

The lighting apparatus for power-receiving-side connector according to Japanese Patent Gazette No. 5582130 comprises the illumination light source that is buried in the upper circumferential wall of the accommodation dent. Accordingly, it is difficult for an operator to visually recognize during charging operations a light emission face through which a light coming from the light source transmits. As a result, it is difficult to utilize the light emission face as an indicator that indicates the remaining magnitudes of charging during the charging operations. Consequently, in order to also use the light emission face as such an indicator, it is possible to think of, as an example, providing the accommodation dent with the lighting apparatus in the bottom face to expose the light emission face so as to make it possible for the operator to visually recognize the light emission face.

Moreover, when a location to be illuminated spreads over a wide range, such as when a power-receiving-side connector is provided for each of an AC power source and a DC power source, it is necessary to expand a light, which comes from the light emission face of the conventional lighting apparatus for power-receiving-side connector, to emit over the wide range. Hence, in order to irradiate the light emission face over a wide range with the light, it is possible to think of bending or curving the light emission face, for instance.

When a lighting apparatus comprising a light emission face that is bent or curved so as to irradiate it over a wide range with a light, and which is exposed to be visually recognizable for an operator, is arranged in the bottom face of the accommodation dent, namely, in a face on which the power-receiving-side connector is disposed, the operator has generally come to visually recognize the bent or curved light emission face from up above obliquely. Therefore, the bent or curved light emission face, which is observable from the operator's point of view, does not have any uniform configuration at all. Hence, the bent or curved light emission face, which is recognizable visually from the operator's point of view, has been associated with a problem in terms of the decorativeness.

SUMMARY OF THE INVENTION

The present invention has been developed in view of the aforementioned circumstances. It is therefore one of the objects of the present invention to provide a lighting apparatus for power-receiving connector, the lighting apparatus illuminating the power-receiving connector over a wide range, and comprising a light emission face that is recognizable visually by an operator and whose decorativeness is upgradeable.

For example, a lighting apparatus according to the present invention, which achieves the aforementioned object, is designed for power-receiving connector including; a power-receiving accommodation chamber having an accommodation bottom face formed to dent from a vehicular outer face; and a power-receiving unit disposed in the accommodation bottom face to be connected to a power-feeding connector; the lighting apparatus is disposed on the accommodation bottom face in the power-receiving chamber, and comprises:

a lighting cover having a cover top face opposing the accommodation bottom face, and a cover side face disposed between the accommodation bottom face and the cover top face;

the cover side face including a light emission face through which a light emits to illuminate the power-receiving unit at least, and inclining so as to overhang from the cover top face toward the accommodation bottom face;

the light emission face including a first emission portion directed to a vehicular lower side, and a second emission portion directed to a vehicular lateral side;

the first emission portion exhibiting a first elevation angle to the accommodation bottom face;

the second emission portion exhibiting a second elevation angle to the accommodation bottom face;

the first elevation angle being smaller than the second elevation angle.

The lighting apparatus for power-receiving connector according to the present invention constructed as described above comprises the light emission face that inclines so as to overhang from the cover top face toward the accommodation bottom face. The light emission face includes the first emission portion, and the second emission portion. The first emission portion is directed to a vehicular lower side. The second emission portion is directed to a vehicular lateral side. Moreover, the first elevation angle, which the first emission portion exhibits to the accommodation bottom face, is made to be smaller than the second elevation angle, which the second emission portion exhibits to the accommodation bottom face.

Thus, the light emission face, which is formed to incline so as to overhang from the cover top face toward the accommodation bottom face, enables an operator to visually recognize the first emission portion and second emission portion. Moreover, the first elevation angle, which is made to be smaller than the second elevation angle, makes the light emission face visually recognizable from or through the sight lines of an operator, even when the light emission face is bent or curved. Therefore, the lighting apparatus for power-receiving connector according to the present invention makes it possible to upgrade the light emission face in the decorativeness within the sight lines from the operator.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
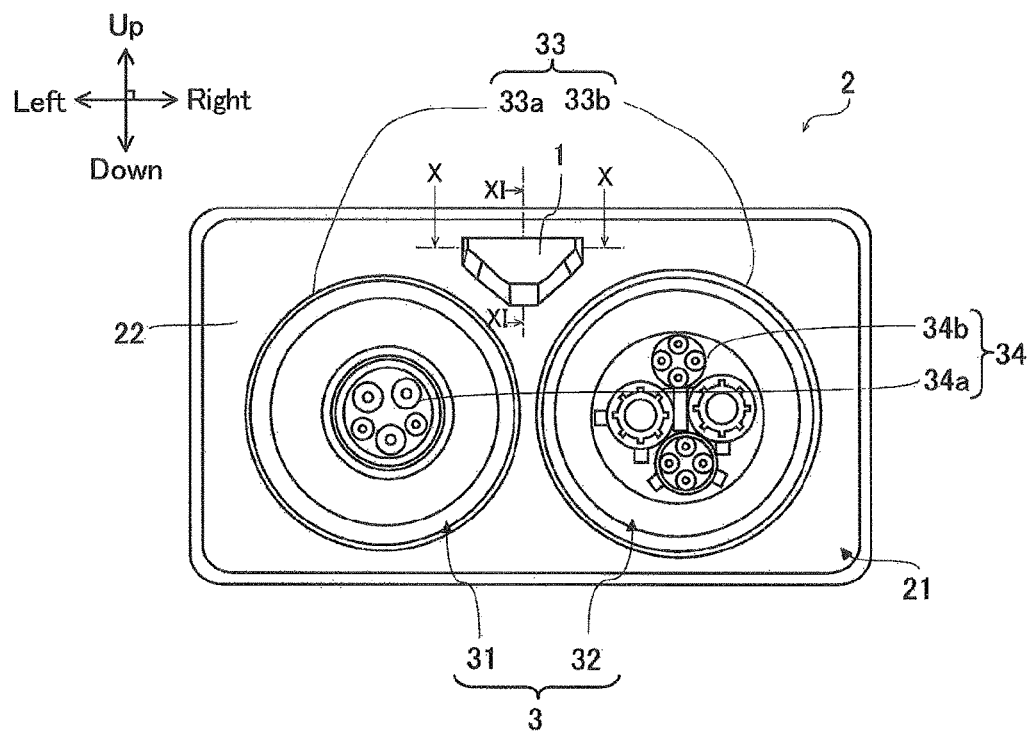
FIG. 1 is a front view of a power-receiving connector 2 to which a lighting apparatus 1 according to First Embodiment of the present invention for power-receiving connector is applied.

Having generally described the present invention, a further understanding can be obtained by reference to the specific preferred embodiments which are provided herein for the purpose of illustration only and not intended to limit the scope of the appended claims.

Hereinafter, a suitable embodiment of a lighting apparatus for power-receiving connector according to the present invention will be described while referring to FIGS. 1 through 15. Note that, in FIGS. 1 through 15, the "right," "left," "up" and "down" indicate directions when an operator faces a charging connector, with which a vehicle is equipped, to view it on the front side. Moreover, a direction directed to a vehicular inner side is labeled "vehicular inside," and another direction directed to a vehicular outer side is labeled "vehicular outside." In addition, the "directions" as noted above imply all of the directions referred to in the present specification. Moreover, the "operator" referred to in the present specification signifies an "operator" who carries out charging operations for connecting a power-feeding connector to a power-receiving unit. The "operator" takes ordinarily-envisioned operation postures, namely, standing-position operational postures.

Since the drawings utilized for describing the present invention are outline drawings, they do not necessarily illustrate the following strictly or precisely: configurations in particular fine sections; relative relationships between positions; and relationships between sizes, for instance. Note that identical members (i.e., constituent elements), or members (i.e., constituent elements) operating and producing advantages likewise with each other, might be identified with identical or relevant symbols or numerals, for the purpose of describing them more understandably in the following descriptions. However, the objective is not at all intended to limit relationships between the two members (i.e., constituent elements).

Moreover, it is possible to grasp specific details, which are not referred to in the present specification especially but are needed to carryout the present invention, as matters that a person having ordinary skill in the art designs based on conventional techniques in the art. That is, it is possible to carry out the present invention based on disclosures in the present specification and technical common knowledge in the art.

First Embodiment

A lighting apparatus 1 for power-receiving connector according to First Embodiment of the present invention is arranged in a power-receiving connector (i.e., a vehicle-side inlet) 2 that is disposed in the outer face (i.e., a body) of a vehicle, such as an electric automobile. A vehicle, such as an electric automobile, has batteries on-board in order to drive the motor. A charging connector is used to charge the batteries. The charging connector comprises a power-feeding connector (not shown), and the power-receiving connector 2. The power-feeding connector makes a fit-in plug that is connected to an external power source. The power-receiving connector 2 includes a power-receiving unit 3 that is connectable with and detachable from the power-feeding connector.

As illustrated in FIG. 1, the power-receiving connector 2 is arranged at a predetermined position in the body (not shown), and includes a power-receiving accommodation chamber 21 and a lid (not shown). The power-receiving accommodation chamber 21 provides an indentation in the body of the vehicle. The lid exposes the power-receiving accommodation chamber 21 to the vehicular exterior at the time of charging, and shields the power-receiving accommodation chamber 21 from the vehicular exterior at times other than charging. Note that, when the lid is closed, it is possible to inhibit rainwater or foreign materials from intruding into the power-receiving chamber 21, because the lid covers the power-receiving accommodation chamber 21 off from the vehicular exterior.

The power-receiving accommodation chamber 21 includes an accommodation bottom face 22, the power-receiving unit 3, and the present lighting apparatus 1 according to First Embodiment. The power-receiving unit 3 can be connected with and detached from the power-feeding connector.

Figure 10:
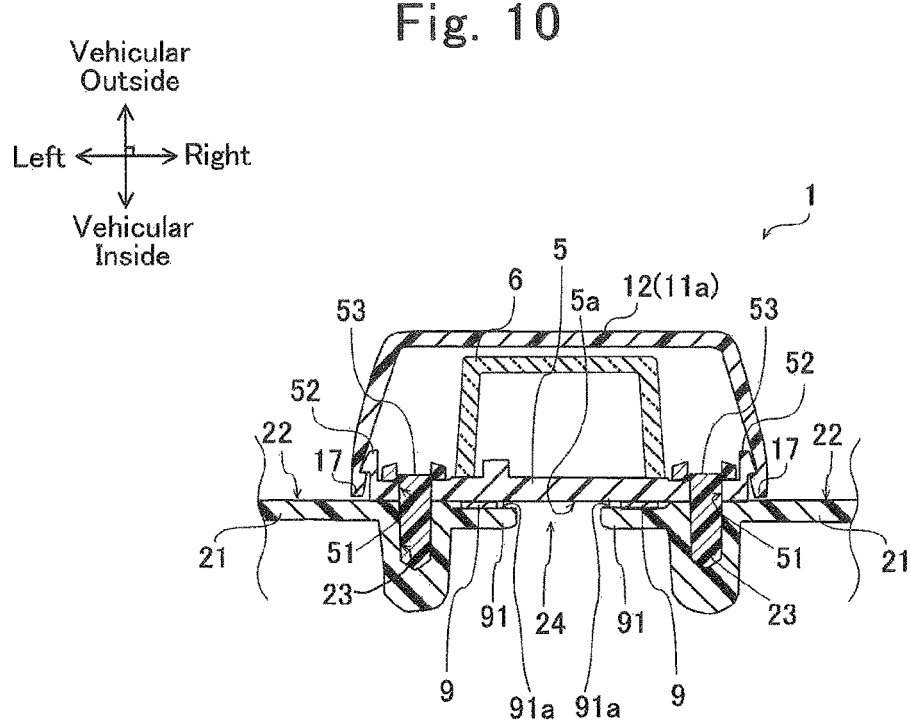
FIG. 10 is a cross-sectional view of the present lighting apparatus 1 according to First Embodiment taken along the chain line in the direction designated at the arrows "X"-"X" in FIG. 1.
Figure 11:
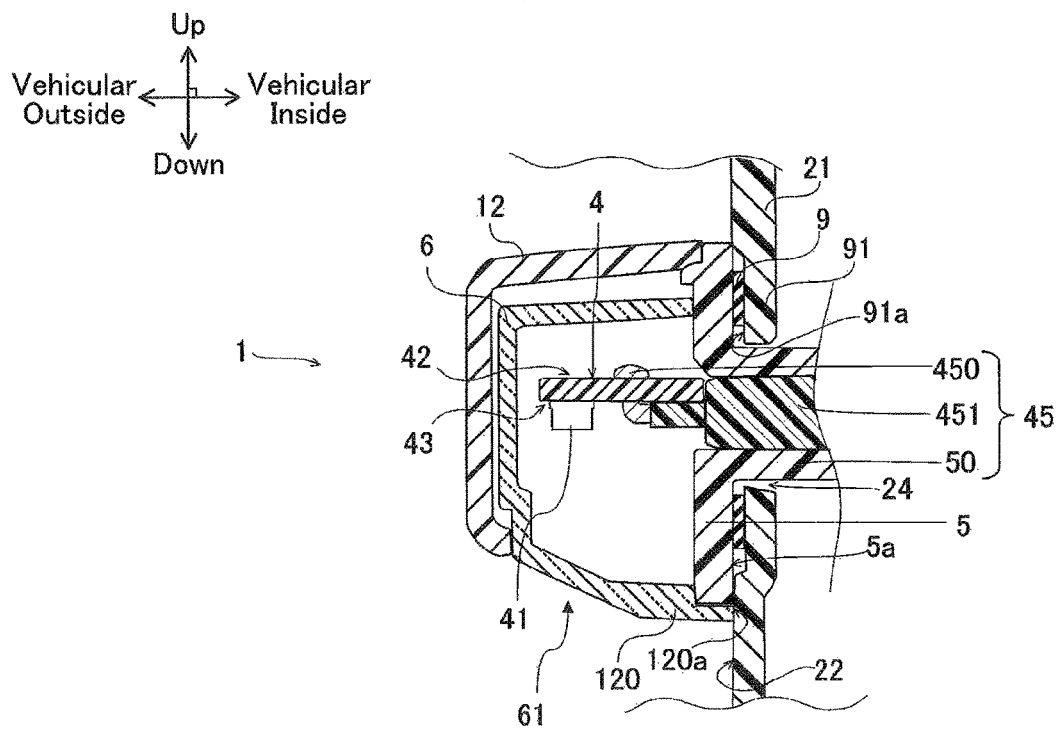
FIG. 11 is another cross-sectional view of the present lighting apparatus 1 according to First Embodiment taken along the other chain line in the direction designated at the arrows "XI"-"XI" in FIG. 1.

As illustrated in FIG. 1, the accommodation bottom face 22 makes the bottom face of the power-receiving accommodation chamber 21 provides an indentation more to a vehicular inner side than in an opening in the body of the vehicle. Moreover, the power-receiving accommodation chamber 21 provides a decorative cover that covers structures inside the vehicle. The accommodation bottom face 22 includes some portions of the surface of the decorative cover. The accommodation bottom face 22 is provided with power-receiving openings (33, 33), and a through bore 24 (see FIGS. 10 and 11). The power-receiving openings (33, 33) expose later-described connectors (34, 34). A later-described power-conducting unit 45 penetrates through the through bore 24. As illustrated in FIGS. 10 and 11, the through bore 24 is formed at a position around which the present lighting apparatus 1 according to First Embodiment is assembled The power-receiving unit 3 includes the power-receiving openings (33, 33), and the connectors (34, 34). The connectors (34, 34) are arranged on a more vehicular inner side than is the accommodation bottom face 22, and are exposed within the power-receiving accommodation chamber 21 by way of the power-receiving openings (33, 33). Moreover, the connectors (34, 34) are connected electrically to a battery, and are coupled with the power-feeding connector to charge the battery with electricity coming from an external power source.

The present lighting apparatus 1 according to First Embodiment comprises the connectors (34, 34) that are made up of a first connector 34a for AC power source, and a second connector 34b for DC power source. Moreover, the power-receiving openings (33, 33) are provided with a first power-receiving opening 33a exposing the first connector 34a, and a second power-receiving opening 33b exposing the second connector 34b. That is, the present lighting apparatus 1 comprises the power-receiving unit 3 that includes a first power-receiving subunit 31, and a second power-receiving subunit 32. The first power-receiving subunit 31 is provided with the first power-receiving opening 33a, and the first connector 34a. The second power-receiving subunit 32 is provided with the second power-receiving opening 33b, and the second connector 34b. The first power-receiving subunit and second power-receiving subunit 32 are placed collaterally or next to one another in the right/left direction.

Thus, the present lighting apparatus 1 according to First Embodiment makes a lighting apparatus that illuminates the power-receiving unit 3 and the feet of an operator. As illustrated in FIG. 1, the present lighting apparatus 1 is disposed between the first power-receiving subunit 31 and the second power-receiving subunit 32 on an upper end section in the accommodation bottom face 22. The present lighting apparatus 1 has a configuration formed as an inverted triangle that is cut down at the apexes when an operator views it on the front side, as shown in FIG. 3.

Figure 5:
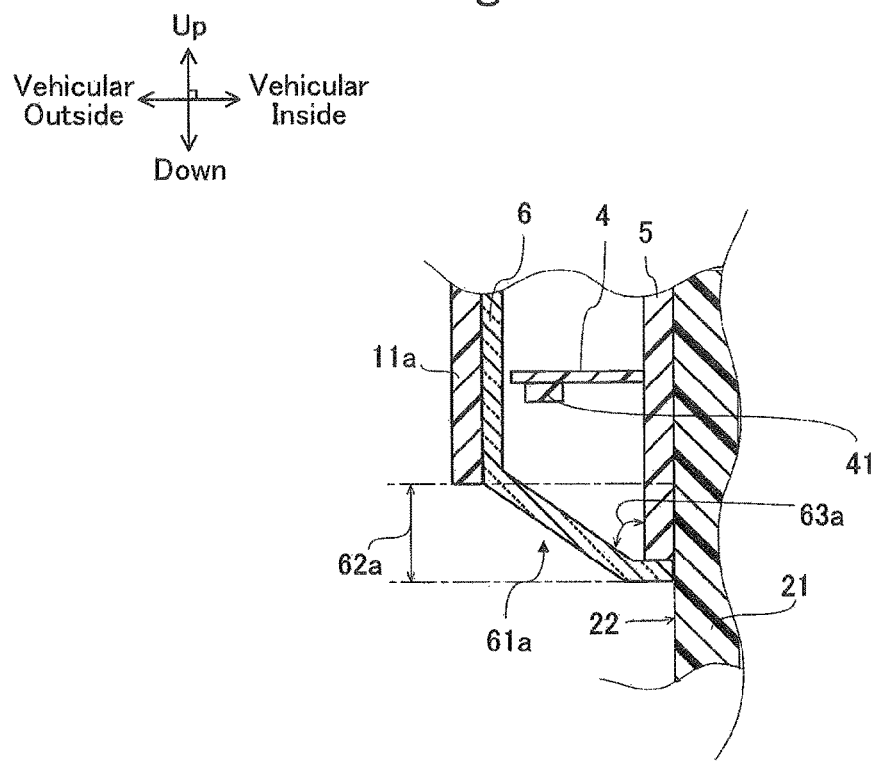
FIG. 5 is a cross-sectional view of the present lighting apparatus 1 according to First Embodiment taken along the chain line in the direction designated at the arrows "V"-"V" in FIG. 3.
Figure 6:
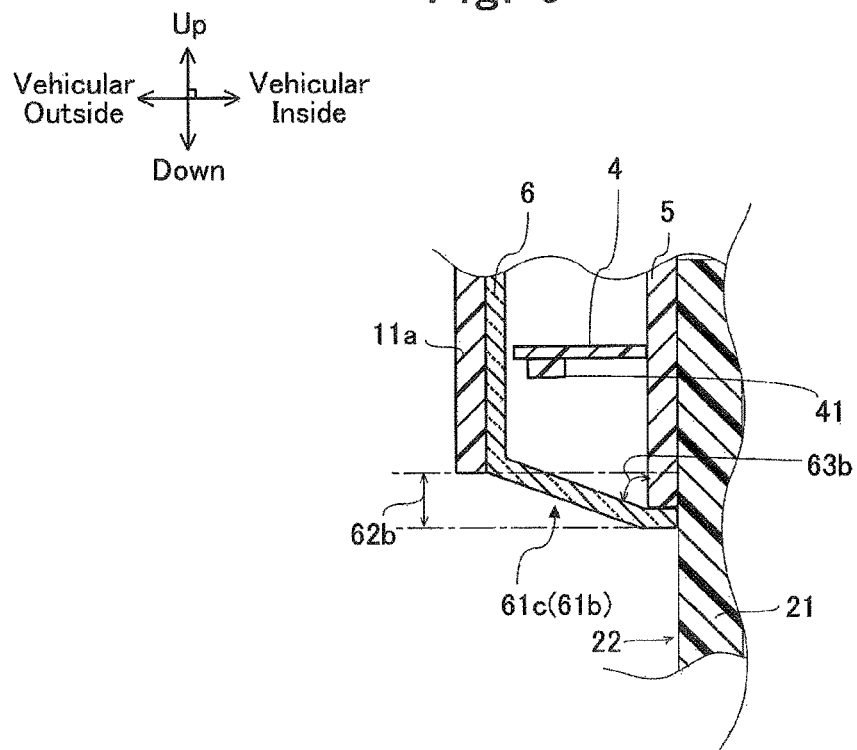
FIG. 6 is another cross-sectional view of the present lighting apparatus 1 according to First Embodiment taken along the other chain line in the direction designated at the arrows "VI"-"VI" in FIG. 3.
Figure 7:
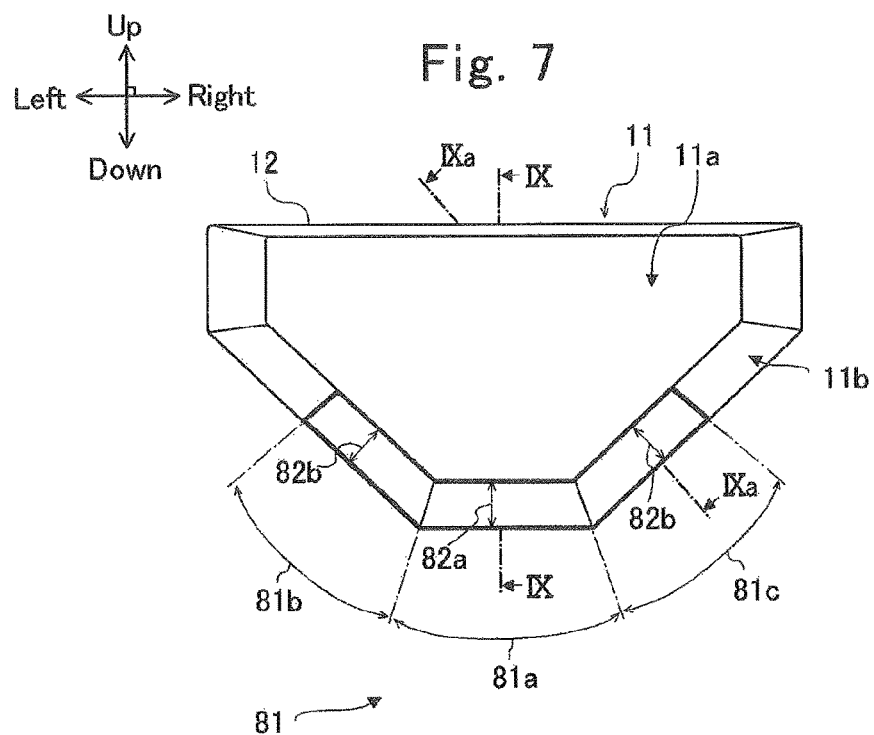
FIG. 7 is a front view of a conventional lighting apparatus 10 for power-receiving connector, lighting apparatus 10 which has been employed heretofore conventionally.

As illustrated in FIGS. 5 and 6, the present lighting apparatus 1 according to First Embodiment further comprises a lighting cover 11, a substrate 4, and a substrate fixture 5. A light source 41 is disposed on the substrate 4. The substrate fixture 5 fastens the substrate 4 in place.

Figure 3:
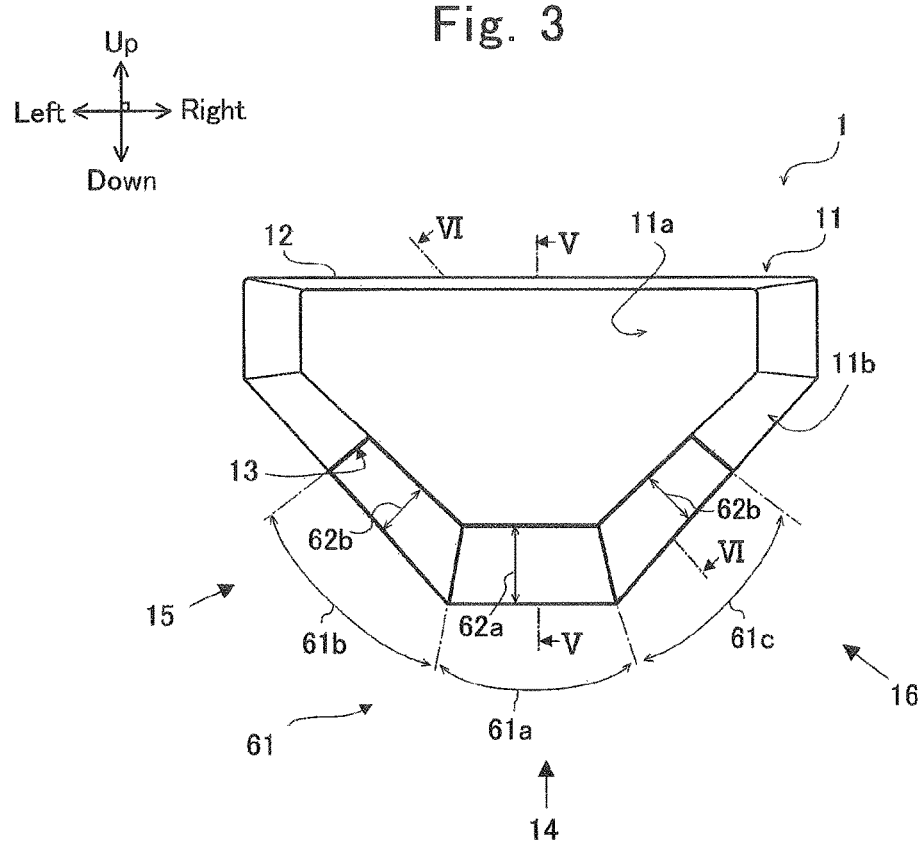
FIG. 3 is a front view of the present lighting apparatus 1 according to First Embodiment.
Figure 4:
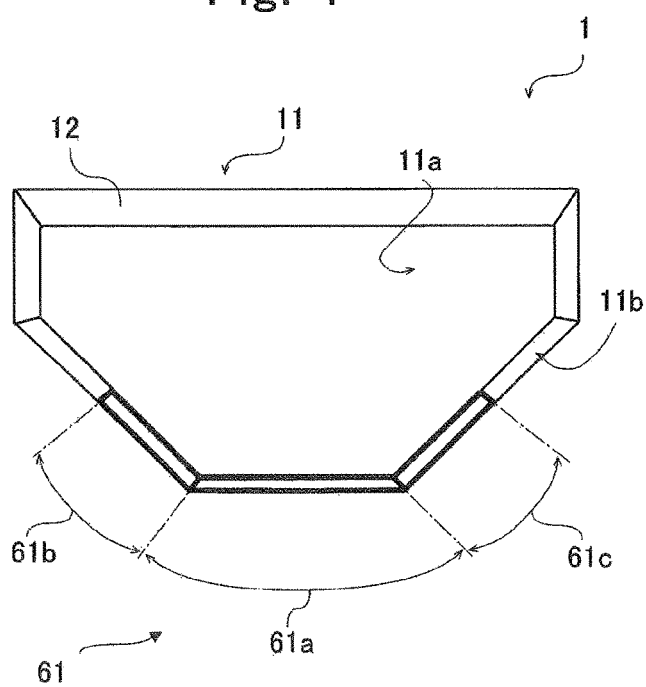
FIG. 4 is a perspective view of the present lighting apparatus 1 according to First Embodiment when being viewed at a front-face operational position (i.e., posture) "P2."

The lighting cover 11 includes a cover top face 11a, and a cover side face 11b, as shown in FIGS. 3 and 4. The cover top face 11a opposes the accommodation bottom face 22 in the power-receiving accommodation chamber 21 by way of the substrate fixture 5 detailed later. The cover side face 11b is placed between the cover top face 11a and the substrate fixture 5, and inclines so as to overhang from the cover top face 11a toward the accommodation bottom face 22, as shown in FIGS. 5 and 6. The cover top face 11a forms the top face of a later-described cover body section 12. The cover side face 11b is made up of the side faces of the cover body section 12, and a light emission face 61. Note that the light emission face 61 makes some of the surfaces of a later-described light transmitting member 6.

The present lighting apparatus 1 according to First Embodiment comprises the cover top face 11a that is arranged so as to be parallel to the accommodation bottom face 22. Note that the cover top face 11a can also incline slightly to the accommodation bottom face 22. For example, the cover top face 11a can even exhibit, to the accommodation bottom face 22, an inclination angle that falls in a range of from 1 to 10 degrees approximately.

As illustrated in FIG. 3, the cover side face 11b includes a lower-end horizontal section 14, a first inclination section 15, and a second inclination section 16. The first inclination section 15 makes the left-hand cover side face 11b, and inclines in the left direction from the upper side toward the lower side. The second inclination section 16 makes the right-hand cover side face 11b, and inclines in the right direction from the upper side toward the lower side. The lower-end horizontal section 14 makes the lowermost side of the cover side face 11b, and extends in the right/left direction to be continuous to and from the first inclination section 15 and second inclination section 16. In the present lighting apparatus 1 according to First Embodiment, the first inclination section 15, and the second inclination section 16 are formed respectively as a linearly symmetric configuration with one another to an imaginary line that elongates in the up/down direction.

The first inclination section 15 is placed on a side of the first power-receiving subunit 31. The second inclination section 16 is placed on a side of the second power-receiving subunit 32. The lower-end horizontal section 14 is placed on a vehicular lower side. The first inclination section 15, the second inclination section 16, and the lower-end horizontal section 14 are provided with the later-detailed light emission face 61.

The lighting cover 11 makes a constituent element that covers the substrate 4 and substrate fixture 5, and includes the cover body section 12 made of resin, and the light transmitting member 6. The cover body section 12 is provided with a notch 13 that exposes the light emission face 61 making some of the surfaces of the light transmitting member 6. Moreover, the cover body section 12 covers the light transmitting member 6 except for the light emission face 61.

The cover body section 12 is a constituent element that shields a light. Therefore, a light coming from the light source 41 is emitted through the light emission face 61 alone. Note that, in the present lighting apparatus 1 according to First Embodiment, the cover side face 11b includes the notch 13 that is formed from a substantially middle in the first inclination section 15 to a substantially middle in the second inclination section 16 via the lower-end horizontal section 14.

The light emission face 61 makes some of the surfaces of the light transmitting member 6 through which a light coming from the light source 41 transmits. Specifically, the light transmission face 61 is part of a surface in the light transmitting member 6 that is exposed through the notch 13 in the cover body section 12 covering the light transmitting member 6.

The light transmission member 6 has an annular shape at the opposite ends, and accordingly has a lid-shaped configuration that is formed so as to cover the substrate 4 and substrate fixture 5, as shown in FIGS. 10 and 11. The light transmitting member 6 is made of resin, for instance. It is preferable for the resin to contain a light-diffusing agent so as to make lights diffuse more. It is possible to apply publicly-known agents to the light-diffusing agent. As the publicly-known light-diffusing agents, it is possible to name the following, for instance: organic particles, such as acrylic-system cross-linked beads and methyl methacrylate-styrene-system (i.e., MS-system) cross-linked beads; or inorganic particles, such as silica, barium sulfate and titanium oxide. It is also allowable to use one of the organic particles and inorganic particles independently, or it is even permissible to combine two or more of them to employ.

As illustrated in FIGS. 3 and 4, the present lighting apparatus 1 according to First Embodiment comprises the light emission face 61 that includes a first emission portion 61a, and two second emission portions (61b, 61c). The first emission portion 61a is formed in the lower-end horizontal section 14 of the cover side face 11b. The second emission portion 61b, one of the two second emission portions (61b, 61c), is formed on a side of the first inclination section 15 of the cover side face 11b. The third emission portion 61c, the other one of the two second emission portions (61b, 61c), is formed on a side of the second inclination section 16 of the cover side face 11b.

The first emission portion 61a is directed to a vehicular lower side, whereas the second emission portions (61b, 61c) are directed to a vehicular lateral side, respectively. Note that the term, "vehicular lateral side," implies one of the opposite sides in the front/rear direction along the traveling direction of a vehicle when the power-receiving connector 2 is disposed in a vehicular outer face on a side of one of the doors through which passengers usually get on and get off the vehicle. Moreover, the term, "vehicular lateral side," implies one of the opposite sides in the widthwise direction of a vehicle when the power-receiving connector 2 is disposed in a vehicular outer face on the front or rear side.

The present lighting apparatus 1 according to First Embodiment comprises the first inclination section 15 and second inclination section 16 formed respectively as a configuration that is linearly symmetric with one another to an imaginary line that elongates in the up/down direction. Therefore, the left-hand second emission portion 61b and right-hand second emission portion 61c are formed likewise as a linearly-symmetric configuration with one another, respectively.

The first light emission portion 61a transmits a light coming from the light source 41 through itself or diffuses the light in itself to enable the present lighting apparatus 1 according to First Embodiment to illuminate an operator at his or her feet. Moreover, the first light emission portion 61a inclines so that it is visually recognizable for the operator on the front-face side. Specifically, when the present lighting apparatus 1 is viewed on the front-face side, the first emission portion 61a inclines so as to overhang from the cover top face 11a toward the accommodation bottom face 22, as shown in FIG. 5. Note that FIG. 5 is a vertical cross-sectional diagram (i.e., the cross-sectional diagram taken in the direction of the arrows "V"-"V" in FIG. 3) in which the present lighting apparatus 1 is cut down from the cover top face 11a to the first emission portion 16a perpendicularly. That is, the first emission portion 61a inclines from up above to down below from the cover top face 11a toward the accommodation bottom face 22. Therefore, the first emission portion 61a protrudes by a first-emission-portion protrusion magnitude 62a to a much lower side than is the cover top face 11a, as shown in FIG. 5. Hence, it is possible for the operator who stands in front of the present lighting apparatus 1 to visually recognize the first emission portion 61a, a constituent element of the light emission face 61, on the front-face side.

The right-hand second light emission portion 61c transmits a light coming from the light source 41 or diffuses the light to illuminate on a side of the second power-receiving subunit 32. Moreover, the second light emission portion 61c inclines so that it is visually recognizable for an operator who stands in front of the present lighting apparatus 1 according to First Embodiment. Specifically, when the present lighting apparatus 1 is viewed on the front-face side, the second emission portion 61c inclines so as to overhang from the cover top face 11a toward the accommodation bottom face 22, as shown in FIG. 6. Note that FIG. 6 is a vertical cross-sectional diagram (i.e., the cross-sectional diagram taken in the direction of the arrows "VI"-"VI" in FIG. 3) in which the present lighting apparatus 1 is cut down from the cover top face 11a to the second emission portion 61c perpendicularly. That is, the second emission portion 61c inclines from up above to down below from the cover top face 11a toward the accommodation bottom face 22. Therefore, the second emission portion 61c protrudes by a second-emission-portion protrusion magnitude 62b to a much lower side than is the cover top face 11a, as shown in FIG. 6. Hence, it is possible for the operator who stands in front of the present lighting apparatus 1 to visually recognize the second emission portion 61c, a constituent element of the light emission face 61, on the front-face side. Note that, in the present lighting apparatus 1, the second emission portion 61b for illuminating on a side of the first power-receiving subunit 31 also exhibits the same second-emission-portion protrusion magnitude 62b as that of the second inclination portion 61c, because the left-hand second emission portion 61b is formed as a configuration that is linearly symmetric with the right-hand second emission portion 61c.

As illustrated in FIGS. 5 and 6, the first emission portion 61a inclines at the angle of an elevation angle 63a to the accommodation bottom face 22. The second emission portions (61b, 61c) incline at the angle of an elevation angle 63b to the accommodation bottom face 22, respectively. Note herein that the term, "a first emission angle 63a," designates to fall on the minor-angle side of angles that are made by the accommodation bottom face 22 and the first emission portion 61a of the light emission face 61. Moreover, the term, "a second emission angle 63b," designates to fall on the minor-angle side of angles that are made by the accommodation bottom face 22 and the second emission portion 61b or second emission portion 61c of the light emission face 61. In addition, the present lighting apparatus 1 according to First Embodiment comprises the first elevation angle 63a that is set up so as to be smaller than the second elevation angle 63b. In other words, the first emission portion 61a inclines to the accommodation bottom face 22 more gently than do the second emission portions (61b, 61c). Hence, the first-emission-portion protrusion magnitude 62a is greater than the second-emission-portion protrusion magnitude 62b.

Incidentally, it is common that, when an operator carries out a charging operation, his or her eye point (i.e., eye pupil) "P," through which the operator visually recognizes the power-receiving connector 2, is placed at a higher position in the vertical direction than another position at which the power-receiving connector 2 is arranged in a vehicle. Moreover, a distance "L" between the operator and the present lighting apparatus 1 according to First Embodiment usually falls in a range from 300 mm to 700 mm approximately. In addition, it is common that the eye point "P" of the operator is placed at a height "H" falling in a range of from 500 mm to 1,000 mm from the present lighting apparatus 1. Moreover, the term, a "charging operation position," means a position at which the operator stands away from the present lighting apparatus 1 by the distance "L" when he or she stands up to face the present lighting apparatus 1 on the front-face side.

Figure 2:
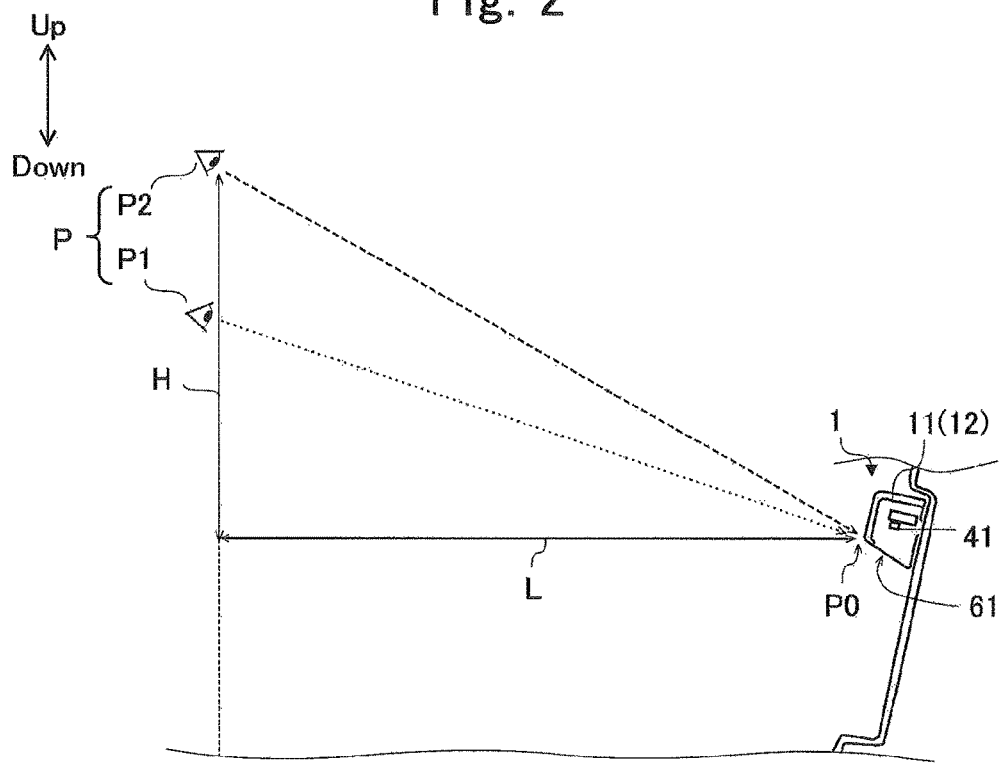
FIG. 2 is an explanatory diagram for illustrating relationships between the present lighting apparatus 1 according to First Embodiment and an operator's eye points (i.e., exit pupils).

In the present lighting apparatus 1 according to First Embodiment, an eye point of "P," through which an operator at an operation position views the cover top face 11a on the front-face side, is labeled a front-face central position "P1," whereas another eye point "P," through which the operator at the operation position carries out a charging operation, is labeled a front-face operational position "P2," as shown in FIG. 2. The eye point "P" in the front-face operational position "P2" lies at a higher position than does the other eye point "P" in the front-face central position "P1." In other words, the present lighting apparatus 1 is arranged on the accommodation bottom face 22 so as to make the front-face central position "P1" lower than the front-face operational position "P2."

Conventional lighting apparatuses for power-receiving connectors, however, distinguish disadvantageously. The disadvantages of the conventional lighting apparatuses will be hereinafter discussed with reference to a lighting apparatus 10, one of the conventional lighting apparatuses, shown in FIGS. 7 through 9. The conventional lighting apparatus 10 comprises a curved light emission face 81. As illustrated in FIG. 9, the light emission face 81 is formed so as to exhibit a first elevation angle 83a and a second elevation angle 83b, both of which are set to be identical with one another. That is, the light emission face 81 is formed so that the first-emission-portion protrusion magnitude 82a and the second-emission-portion protrusion magnitude 82b are identical with one another. Note that FIG. 9 is a drawing that illustrates a first emission portion 81a in a cross-sectional diagram taken along the arrows "IX"-"IX" in FIG. 7 and a second emission portion 81c (or a second emission portion 81b) in a cross-sectional diagram taken along the arrows "IX$_a$"-"IX$_a$" in FIG. 7.

Figure 8:
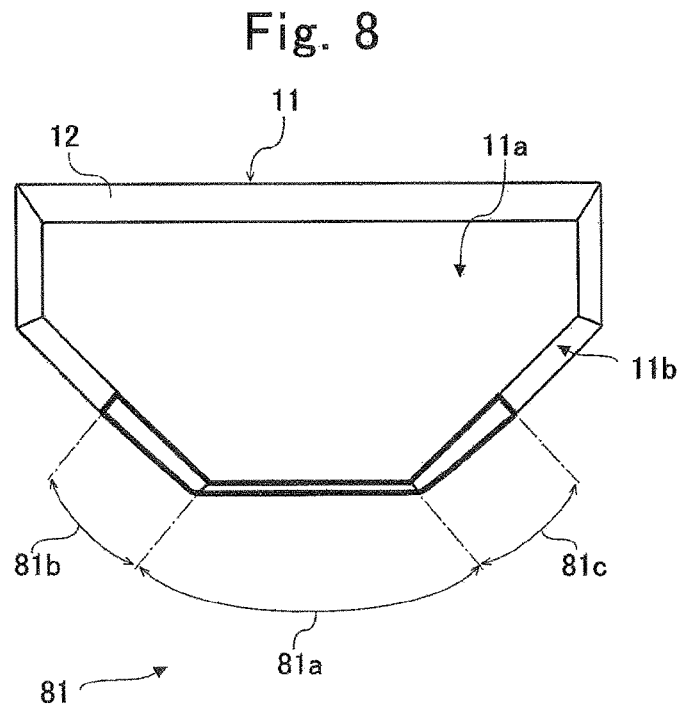
FIG. 8 is a perspective view of the conventional lighting apparatus 10 when being viewed at a front-face operational position (i.e., posture) "P2."
Figure 9:
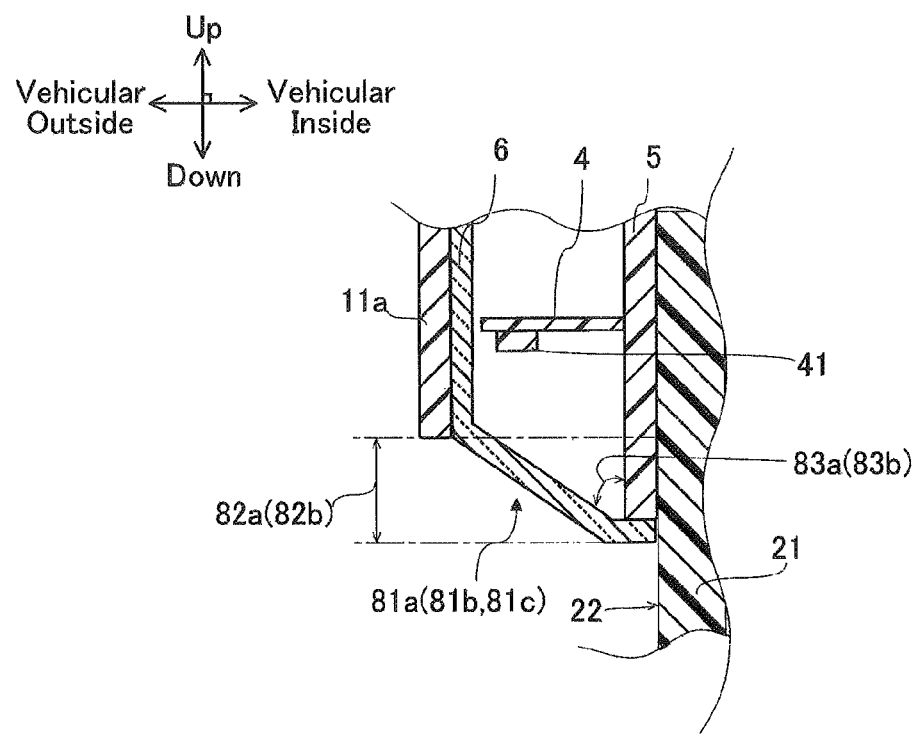
FIG. 9 is a cross-sectional view of the conventional lighting apparatus 10 taken along the chain lines in the directions designated at the arrows "IX"-"IX" as well as the arrows "$IX_a$"-"$IX_a$" in FIG. 7.

In the thus constructed conventional lighting apparatus 10, the light emission face 81, which is visually recognizable for an operator through the front-face operational position "P2" shown in FIG. 2, comes to have a configuration whose first emission portion 81a exhibits a smaller width than another width that the second emission portions (81b, 81c) exhibit, as shown in FIG. 8.

On the contrary, however, in the present lighting apparatus 1 according to First Embodiment, the first emission portion 61a is set to exhibit the first elevation angle 63a that is smaller than the second elevation angle 63b exhibited by the second emission portions (61b, 61c), as shown in FIGS. 5 and 6. As a result, the first emission portion 61a is set to exhibit the first-emission-portion protrusion magnitude 62a that is greater than the second-emission-portion protrusion magnitude 62b exhibited by the second emission portions (61b, 61c).

The thus formed first emission portion 61a and second emission portions (61b, 61c) enable an operator at the front-face operational position "P2" shown in FIG. 2 to visually recognize that the width of the first emission portion 61a and the width of the second emission portions (61a, 61c) appear to be uniform one another, as shown in FIG. 4. In other words, the operator can visually recognize the light emission face 61, which overhangs from the cover top face 11a, so that it comes to have a width that appears to be uniform as a whole from the second emission portion 61b to the second emission portion 61c by way of the first emission portion 61a in the overhanging direction of the light emission face 61. Therefore, the present lighting apparatus 1 according to First Embodiment enables the light emission face 61, which the operator recognizes visually, to exhibit upgraded decorativeness. Moreover, since the operator can visually recognize the light emission face 61 to be uniform as a whole, it is feasible to utilize the light emission face 61 as an equally-divided indicator that tells the operator charged conditions, for instance. Note herein that the wording, "being uniform," also involves such a meaning as "being uniform substantially" in the present specification.

It is preferable that a ratio of the second elevation angle 63b, which the second emission portions (61b, 61c) exhibit as shown in FIG. 6, to the first elevation angle 63a, which the first emission portion 61a exhibits as shown in FIG. 5, namely, "(Second Elevation Angle 63b)/(First Elevation Angle 63a)," can fall in a range of from 1.05 to 1.20. When the ratio falls within the range, it is possible for an operator, who views the light emission face 61 through the eye point "P" at the front-face operational position "P2" shown in FIG. 2, to visually recognize that the light emission face 61, which overhangs from the cover top face 12a, has a uniform width in the overhanging direction as a whole from the second emission portion 61b to the second emission portion 61c by way of the first emission portion 61a. Moreover, the first emission portion 61a can illuminate a vehicular downward side, namely, a side on the operator's feet, more effectively. In addition, the second emission portions (61b, 61c) can illuminate the first power-receiving subunit 31 and second power-receiving subunit 32, which correspond respectively to the second emission portions (61b, 61c), more effectively.

Moreover, it is preferable that a ratio of the first-emission-portion protrusion magnitude 62a, which the first emission portion 61a exhibits as shown in FIG. 5, to the second-emission-portion protrusion magnitude 62b, which the second emission portions (61b, 61c) exhibit as shown in FIG. 6, namely, "(First-emission-portion Protrusion Magnitude 62a)/(Second-emission-portion Protrusion Magnitude 62b)," can fall in a range of from 1.4 to 1.8. When the ratio falls within the range, the present lighting apparatus 1 according to First Embodiment can produce the same advantageous effects as the above-described advantageous effects resulting from the ratio of the second elevation angle 63b to the first elevation angle 63a, which is set up between the first emission portion 61a and the second emission portions (61b, 61c), as set forth above.

In addition, the light emission face 61 includes a stepped portion 120, whose thickness changes, at one of the opposite ends, namely, at the contact end between the light transmitting member 6 and the substrate fixture 5, as shown in FIG. 11. The substrate fixture 5 fits into the stepped portion 120 at one of the opposite ends. The stepped portion 120 has a leading-end face 120a that is formed so as to coincide with a bottom face 5a of the substrate fixture 5. The light transmitting member 6 with the stepped portion 120 can widen the light-emitting area, compared with the light transmitting member 6 not provided with the stepped portion 120.

(Internal Structure)

As an internal structure for the present lighting apparatus 1 according to First Embodiment, it is preferable that the substrate 4 and substrate fixture 5 can be constructed as described below.

Figure 13:
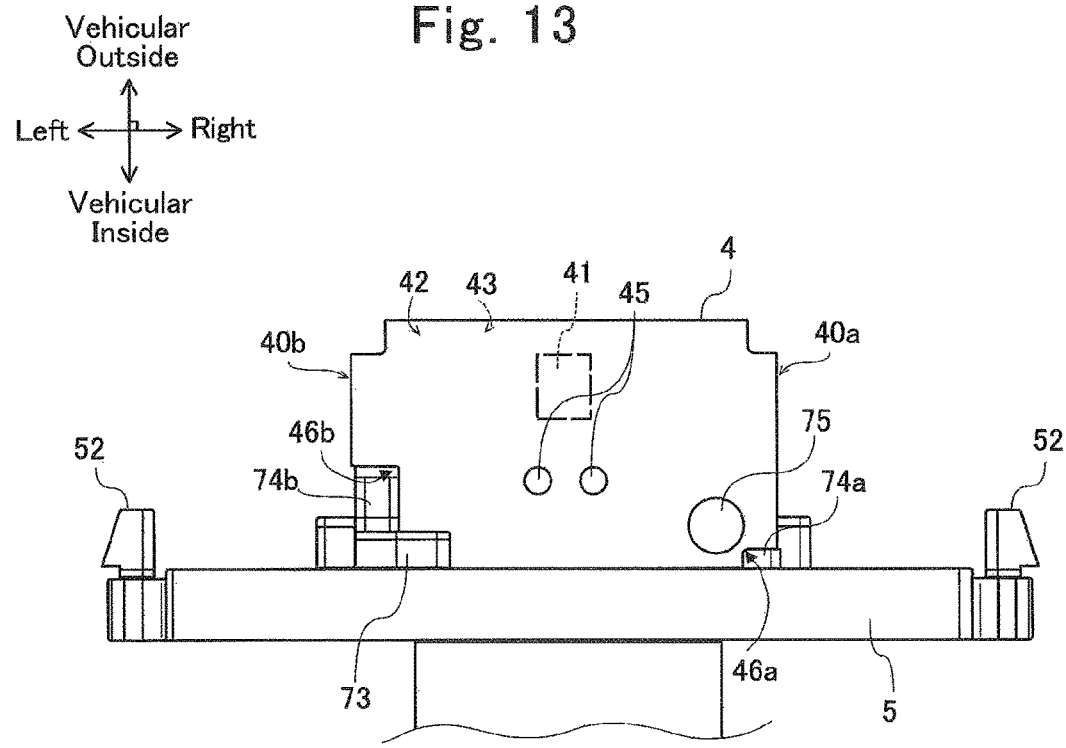
FIG. 13 is an explanatory diagram for schematically illustrating how a substrate 4 is fixed on the substrate fixture 5.
Figure 14:
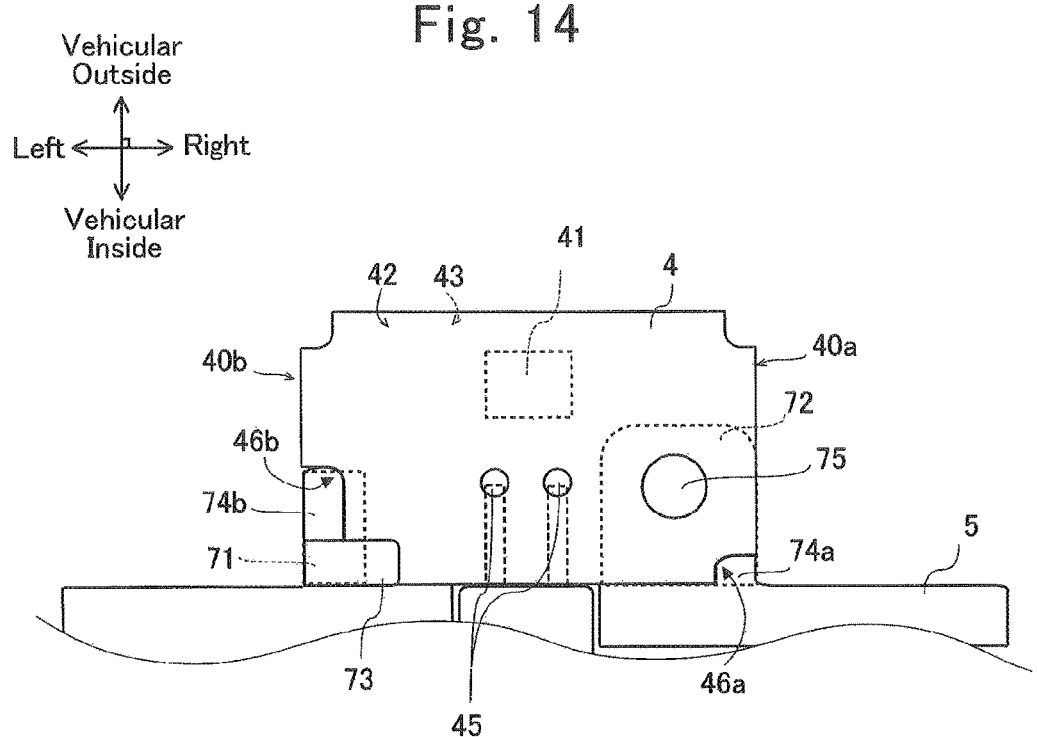
FIG. 14 is another explanatory diagram for schematically illustrating how the substrate 4 is fixed on the substrate fixture 5.

The substrate 4 includes a light-emitting circuit. The light-emitting circuit receives powers from batteries, which are mounted on a vehicle, byway of the power-conducting unit 45, and then makes the light source 41 emit a light. As illustrated in FIGS. 13 and 14, the substrate 4 is formed as a thin plate shape that has a lower face 43, an upper face 42, a right-hand wall 40a, and a left-hand wall 40b. The lower face 43 is provided with the light source 41. The upper face 42 opposes the lower face 43 back-to-back. The right-hand wall 40a and left-hand wall 40b cross the lower face 43 and upper face 42 perpendicularly, and are placed at the opposite ends of the substrate 41 in the right/left direction. The light source 4 is made of an LED lamp, but can also be made of the other lamp, such as an organic EL lamp or incandescent lamp, for instance.

As illustrated in FIG. 11, the power-conducting unit 45 includes a lead cable 450, a tube 50, and an insulator 451. The lead cable 450 is connected electrically to a battery at one of the opposite ends, and is connected electrically to the light-emitting circuit at the other one of the opposite ends. As illustrated in FIG. 11, the tube 50 extends from the later-described bottom face 5a of the substrate fixture 5, and has the lead cable 450 placed at the axial center. The insulator 451 is provided coaxially with the tube 50. Moreover, the insulator 451 intervenes between the lead cable 450 and the tube 50 to inhibit foreign materials from intruding into the interior of the present lighting apparatus 1 according to First Embodiment.

As illustrated in FIGS. 13 and 14, the substrate 4 is provided with a cut-off dent 46 at each of the right and left opposite ends on a vehicular inside, namely, on a side of the substrate fixture 5. The cut-off dent 46 includes a first substrate-side dent 46a, and a second substrate-side dent 46b. The first substrate-side dent 46a is placed on the right-end side of the substrate 4 to engage with a later-described first positioning subsection 74a. The second substrate-side dent 46b is placed on the left-end side of the substrate 4 to engage with a later-described second positioning subsection 74b. Moreover, the substrate 4 is provided with a through hole (not shown) into which a later-described fixture 75 is inserted, and another thorough hole (not shown) into which the lead cable 450 is inserted.

The substrate fixture 5 not only fastens the substrate 4 in place, but also fastens the lighting cover 11 in place. The substrate fixture 5 fixed the substrate 4 in a cantilevered manner, as shown in FIG. 11.

Figure 12:
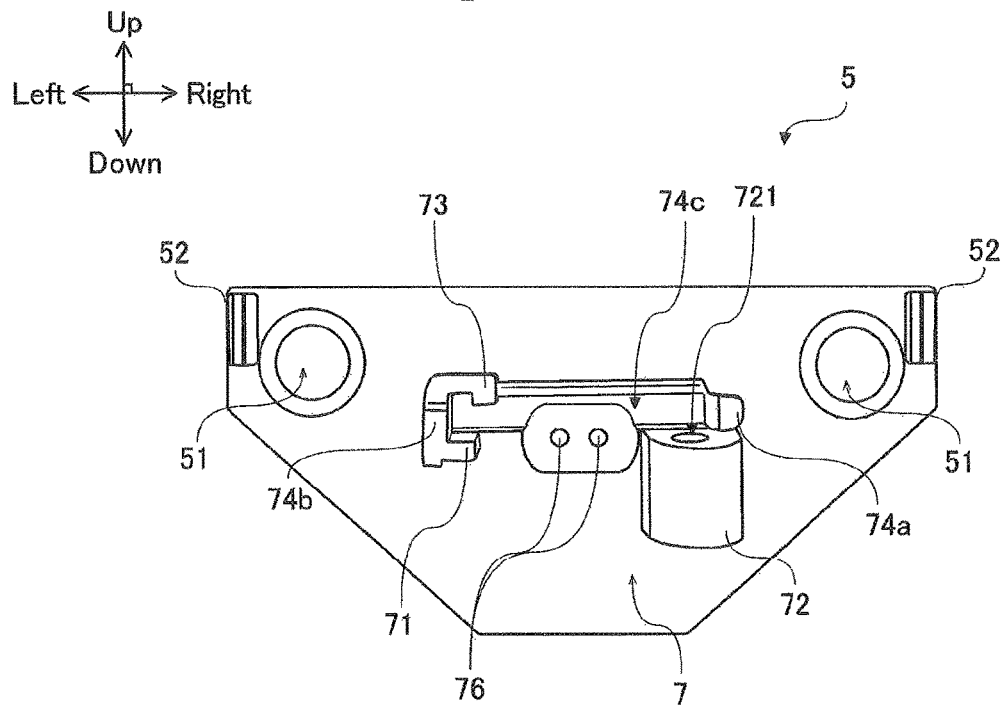
FIG. 12 is an explanatory diagram for illustrating a substrate fixture 5, namely, one of the constituent elements of the present lighting apparatus 1 according to First Embodiment shown in FIG. 1.

As illustrated in FIG. 12, the substrate fixture 5 is a resinous constituent element that is formed as the same configuration as the present lighting apparatus 1 according to First Embodiment has on the outer circumference. The substrate fixture 5 is provided with screw insertion bores (51, 51), and fixture engagement claws (52, 52). The screw insertion holes (51, 51) are formed above on the right- and left-hand opposite sides of the substrate fixture 5, respectively. The fixture engagement claws (52, 52) are formed on more outer sides than are the screw insertion bores (51, 51) in the right/left direction, respectively. To attach the substrate fixture 5 onto the power-receiving accommodation chamber 21, screws (53, 53) are screwed into screw engagement holes (23, 23), which are formed in the power-receiving accommodation chamber 21, byway of the screw insertion holes (51, 51), as shown in FIG. 10. The substrate fixture 5 is fixed onto the power-receiving accommodation chamber 21 under such a condition that it is press contacted with (or adhered closely onto) the accommodation bottom face in the power-receiving accommodation chamber 21. Moreover, to fix the lighting cover 11 onto the substrate fixture 5, cover engagement claws (17, 17), with which the cover body section 12 is provided, are engaged with fixture engagement claws (52, 52), with which the substrate fixture 5 is provided.

As illustrated in FIG. 12, the substrate fixture 5 includes a retaining portion 7 that fastens the substrate 4 in a cantilevered manner. The retaining portion 7 is placed in the middle of the substrate fixture 5, and is provided with a substrate seat 71, a fixture seat 72, a substrate retainer 73, a positioning section 74, a fixture 75 (see FIG. 13 or 14), and lead-cable insertion bores (76, 76).

The substrate seat 71, the fixture seat 72, and the substrate retainer 73 project from the substrate fixture 5. The lead-cable insertion bores (76, 76) make through bores into which the lead cable 450 is inserted. In the present lighting apparatus 1 according to First Embodiment, the positioning section 74 is made up of a first positioning subsection 74a, a second positioning subsection 74b, and a third positioning dent 74c, as shown in FIG. 12. The first positioning subsection 74a, and the second positioning subsection 74b project from the substrate fixture 5, but the third positioning dent 74c makes a groove-shaped dent that is formed in the substrate fixture 5. The fixture 75 is made of a screw, which engages with the fixture seat 72 by way of the substrate 4, for instance. Other than the fixture 75, the respective constituent elements of the retaining portion 7 are formed integrally with the substrate fixture 5 by injection molding, or the like.

As illustrated in FIG. 12, the third positioning dent 74c of the positioning section 74 is formed as such a grooved configuration as engaging with one of the opposite ends of the substrate 4 that the retaining portion 7 retains. Specifically, the third positioning dent 74c is formed so as to have a predetermined length in the right/left direction. The predetermined length in the right/left direction is slightly larger than a length that the substrate 4 has at one of the opposite ends in the right/left direction that perpendicularly crosses the thickness-wise direction of the substrate 4 at the one of the opposite ends (i.e., the fixed end). Moreover, the third positioning dent 74c is formed so as to have another predetermined length in the up/down direction, namely, a length that is slightly larger than a plate thickness that the substrate 4 has. In addition, the third positioning dent 74c is provided with the substrate seat 71, fixture seat 72, substrate retainer 73, first positioning subsection 74a and second position subsection 74b at the circumferential edge on both opposite sides in the right/left direction.

As illustrated in FIGS. 12 and 14, the substrate seat 71 makes the left-end circumferential edge of the third positioning dent 74c, and is formed so as to place thereon the substrate 4 at one of the opposite ends on the left-end side. The substrate seat 71 is in contact with the lower face 43 of the substrate 4 that is put in place on the substrate seat 71.

The fixture seat 72 makes the right-end circumferential edge of the third positioning dent 74c, and is formed so as to place thereon the substrate 4 at one of the opposite ends on the right-end side. The fixture seat 72 is in contact with the lower face 43 of the substrate 4 that is put in place on the fixture seat 72.

The fixture seat 72 is provided with a fixture engagement bore 721 that engages with the fixture 75, one of the constituent elements of the retaining portion 7. The fixture engagement bore 721 has a configuration that is screwed together with the fixture 75 made of a screw, for instance.

The substrate retainer 73 makes the left-end circumferential edge of the third positioning dent 74c, and is formed so as to held the substrate 4 at one of the opposite ends on the left-end side between itself and the substrate seat 71. The substrate retainer 73 is in contact with the upper face 42 of the substrate 4 that is put in place on the substrate seat 71.

The present lighting apparatus 1 according to First Embodiment comprises the positioning section 74 that includes the first positioning subsection 74a, the second positioning subsection 74b, and the third positioning dent 74c. The first positioning subsection 74a is placed at the right-end circumferential edge of the third positioning dent 74c, and is formed so as to come in contact with the right-hand wall 40a of the substrate 4. Moreover, the first positioning subsection 74a is formed on the upper side of the fixture seat 72 to be integral with the fixture seat 72. In addition, the first positioning subsection 74a is formed so as to have a width in the up/down direction that is equal to a plate thickness of the substrate 4 in size.

The second positioning subsection 74b makes the left-end circumferential edge of the third positioning dent 74c, and is formed so as to come in contact with the left-hand wall 40b of the substrate 4. Moreover, the second positioning subsection 74b is formed on the upper side of the substrate seat 71 to be integral with the substrate seat 71. In addition, the second positioning subsection 74b is formed so as to have a width in the up/down direction that is equal to a plate thickness of the substrate 4 in size.

The substrate 4 is fixed to the retaining portion 7 of the substrate fixture 5 in a cantilevered manner as described below. First of all, the lead cable 450, which extends from a vehicular inner side through the through bore 24 formed in the power-receiving accommodation chamber 21, is inserted into the lead-cable through bores (76, 76) formed in the substrate fixture 5. Then, the lead cable 450 is fixed onto the substrate 4 by such a method as soldering.

Next, the substrate 4 is engaged at one of the opposite ends with the third positioning dent 74c of the retaining portion 7. On this occasion, the substrate 4 is put in place at one of the opposite ends, namely, at the left-hand end side, on the seat substrate 71. Moreover, the substrate 4 is put in place at the one of the opposite ends, namely, at the right-hand end side, on the fixture seat 72. The first substrate dent 46a of the substrate 4 is in contact with the first positioning subsection 74a of the substrate fixture 5, and the second substrate dent 46b of the substrate 4 is in contact with the second positioning subsection 74b of the substrate fixture 5. Moreover, together with the substrate seat 71, the substrate retainer 73 holds or interposes (i.e., sandwiches or inserts) the substrate 4 between them at the left-hand end side.

Finally, the fixture 75 fixes the substrate 4 to complete the attachment of the substrate 4 onto the substrate fixture 5.

Since the present lighting apparatus 1 according to First Embodiment comprises the substrate fixture 5 that includes the retaining portion 7, it is possible for an assembly operator or robot to easily carry out positioning the substrate 4. That is, before the fixture 75 fastens the substrate 4 in place, the substrate seat 71 and fixture seat 72 can retain the substrate 4 temporarily. Moreover, the substrate seat 71 and fixture seat 72 make it feasible to carry out positioning the substrate 4 in the up/down direction. In addition, the first positioning subsection 74a and second positioning subsection 74b enable the assembly operator or robot to carry out positioning the substrate 4 in the right/left direction before fixing it. Moreover, the third positioning dent 74c makes it feasible to carry out positioning the substrate 4 in directions crossing perpendicularly the up/down direction and right/left direction, namely, in directions toward the vehicular outside and vehicular inside. Therefore, it is possible for the assembly operator or robot to inhibit the substrate 4 from being displaced or misaligned out of position when attaching the substrate 4 onto the substrate fixture 5. In addition, since the retaining portion 7 exhibits the positioning function even after it has fixed the substrate 4, it is possible to inhibit positional displacements or misalignments of the substrate 4 that result from vibrations occurring while the vehicle is traveling, for instance.

As illustrated in FIGS. 12 through 14, the present lighting apparatus 1 according to First Embodiment comprises the fixture 75 that fastens the substrate 4 at one location on the right-hand end side in order to reduce the quantity of component parts and simplify the fixing operation, for instance. On this occasion, when it is intended to materialize to firmly fix the substrate 4 with the fixture 75, there might possibly arise such a fear as the so-called "pop-up" in which the substrate 4 is pushed up in the upward direction, which is opposite to the fixing direction (i.e., the downward direction), at the left-hand end side on the one of the opposite ends, which is opposite to the fixture seat 72, namely, opposite to the location that the fixture 75 fixes the substrate 4 (see FIG. 13 or 14). Hence, the present lighting apparatus 1 comprises the retaining portion 7 that includes the substrate retainer 73 in order to inhibit the substrate 4 from popping up. Therefore, even if the fixture 75 fastens the substrate 4 firmly in place, it is possible to inhibit the substrate 4 from being displaced or misaligned out of position by the "pop-up." Moreover, the substrate retainer 73 also performs the function of positioning the substrate 4 in the up/down direction.

Thus, the present lighting apparatus 1 according to First Embodiment makes it possible to firmly fix the substrate 4 even when it is fixed to the substrate fixture 5 in a cantilevered manner, and to effectively inhibit the substrate 4 from being displaced or misaligned out of position while assembling the substrate 4 with the substrate fixture 5, and after the assemblage. Hence, it is possible to inhibit the substrate 4 including the light source 41 from being broken. Moreover, since the substrate 4 is inhibited from being displaced or misaligning out of position to result in displacing or misaligning the light source 41 out of position, it is possible to inhibit the power-receiving unit 3, and so on, from being illuminated insufficiently.

In the present lighting apparatus 1 according to First Embodiment, it is preferable that the location, at which the fixture 75 fixes the substrate 4 onto the substrate fixture 5, can be on the right-hand end side of the substrate 4 placed on a side of the second power receiving subunit 32, not on a side of the first power-receiving subunit 31. That is, it is more preferable that the fixture seat 72 can be placed at the right-hand end side in the circumferential edge of the third positioning dent 74c that is formed in the retaining portion 7 of the substrate fixture 5, as shown in FIG. 12.

Incidentally, as means for charging the batteries of a vehicle, like an electric automobile, the following are available: a charging means by a power-feeding connector that comes from a household power source (i.e., AC power source); and another charging means by a power-feeding connector in an electric-automobile charging station (i.e., DC power source). It is common that the electric-automobile charging station is present in such well-lighted places that enable an operator to carry out charging operations with ease. However, when the operator charges the batteries by the power-feeding connector coming from the a household power source that is located in his or her home parking lot, or the like, it is also imaginable that he or she carries out the charging operations under such circumstances as it is dark at his or her hand or feet because any sufficient lighting equipment is not available. Hence, it is preferable that, when illuminating the power-receiving connector 2, the present lighting apparatus 1 according to First Embodiment can illuminate on a side of the first power-receiving subunit 31, which is coupled with the power-feeding connector coming from a household power source, brighter than on a side of the second power-feeding subunit 32.

The fixture seat 72 is designed to be greater in the downward direction than is the substrate seat 71 by such an extent that the fixture 75 is inserted. In other words, the fixture seat 72 is more likely to shield a light coming from the light source 41 than is the substrate seat 71. Hence, in the present lighting apparatus 1 according to First Embodiment, the fixture seat 72, which is greater than the substrate seat 71, is arranged so as to be placed on a side of the second power-receiving subunit 32 for DC power source. Thus, a light coming from the light source 41 reaches more on a side of the first power-receiving subunit 31 for AC power source than on a side of the second power-receiving subunit 32 for DC power source. That is, even when an operator is in his or her home parking lot where it is dark at his or her hands or feet because no sufficient lighting equipment is available, the first power-receiving subunit 31 is illuminated brighter than is the second power-receiving subunit 32. Hence, it becomes readily for the operator to carry out battery charging operations because the operator can couple the power-feeding connector for household power source with the first power-receiving subunit 31 with ease.

The present lighting apparatus 1 according to First Embodiment is assembled with the power-receiving connector 2 as described below. First of all, the substrate 4 is fixed onto the substrate fixture 5 as described above. Then, the substrate fixture 5 with the substrate 4 fixed thereon is fixed onto the accommodation bottom face 22 starting at the vehicular outer side, namely, starting at a side of the power-receiving accommodation chamber 21. On this occasion, the substrate fixture 5 is arranged on the accommodation bottom face 22, as shown in FIG. 10, so as to communicate the two screw insertion bores (51, 51) that are formed at the right and left opposite ends in the substrate fixture 5, respectively, with the two screw engagement holes (23, 23) that are formed in the power-receiving accommodation chamber 21.

Moreover, the two screws (53, 53) are screwed together with the two screw engagement holes (23, 23) by way of the substrate fixture 5. In this way, the substrate fixture 5 is fixed onto the power-receiving accommodation chamber 21 in such a state as being in press contact with the accommodation bottom face 22 (or in such a state as being closely adhered thereto).

Subsequently, the light transmitting member 6 is attached by welding onto the substrate fixture 5 with the substrate 4 fixed thereon so as to cover the substrate fixture 5. Specifically, the light transmitting member 6 can preferably be attached by welding onto the substrate fixture 5 over the entire end periphery where the light transmitting member 6 contacts the substrate fixture 5. Thus, it is possible to inhibit the substrate 4 accommodated within the light transmitting member 6 from being exposed to water resulting from rainwater, or the like. Although the method of attachment by welding is not at all restricted especially, the following can be used, for instance: attachment by ultrasonic welding, attachment by vibration welding, attachment by high-frequency welding, attachment by laser welding, and attachment by thermal welding.

Finally, the light transmitting member 6 is covered by the cover body section 12 so as to let the light emission face 61 making the light transmitting member 6 be exposed partially through the notch 13 formed in the cover body section 12, as shown in FIG. 11. Then, the cover body section 12 is installed onto the substrate fixture 5. Note that it is possible to carry out the installation of the cover body section 12 onto the substrate fixture 5 by engaging the cover engagement claws (17, 17) of the cover body section 12 respectively with the fixture engagement claws (52, 52) of the substrate fixture 5, as shown in FIG. 10.

In this way, the present lighting apparatus 1 according to First Embodiment is assembled with the accommodation bottom face 22 in the power-receiving accommodation chamber 21, as shown in FIGS. 1 and 3. That is, the present lighting apparatus 1 is installed to the accommodation bottom face 22 from a vehicular outer side. Therefore, even when troubles, which occur in the substrate 4 or in the light source 4 provided on the substrate 4, necessitate replacing them, it is possible for an operator to carryout the replacement operations easily on a vehicular outer side.

(External Structure)

As an external structure, it is preferable that the present lighting apparatus 1 according to First Embodiment can further comprise such a double-sided adhesive tape as disclosed below.

Moreover, when the power-receiving connector 2 comprises the present lighting apparatus 1 according to First Embodiment, it is possible to interpose a double-sided adhesive tape 9 between the bottom face 5a of the substrate fixture 5 and the accommodation bottom face 22 in the power-receiving accommodation chamber 21, for the purpose of upgrading the present lighting apparatus 1 in the water shutoff or waterproof property. The both-sided adhesive tape 9 will be hereinafter described. Note that, in the following descriptions, a "charging apparatus" is equivalent to the power-receiving connector 2. Moreover, a "lighting unit" is equivalent to the present lighting apparatus 1. In addition, a "wall member" is a decorative cover; namely, it is equivalent to the power-receiving accommodation chamber 21. Moreover, a "body unit" includes the substrate 4 with the light source 41 provided thereon, the cover body section 12 and light transmitting member 6 that make the lighting cover 11, and the substrate fixture 5. In addition, a "light-emitting unit" is equivalent to the substrate 4 with the light source 41 provided thereon.

As illustrated in FIGS. 10 and 11, a stepped portion 91 is formed at the opening circumferential edge of the through bore 24 that is formed in the accommodation bottom face 22 in the power-receiving accommodation chamber 21. The stepped portion 91 has an annular shape that is formed along the opening of the through bore 24. The stepped portion 91 is bent to form into a substantially crank shape so that it is placed on a more vehicular inner side than is its own outer circumference.

Although the stepped portion 91 has a width (i.e., a radial length at the opening of the through bore 24) that is not at all limited especially, it can have a width that makes it possible to adhere the later-described double-sided adhesive tape 9 thereon. Moreover, the outer circumference of the stepped portion 91 (equivalent to the accommodation bottom face 22 in the power-receiving chamber 21 shown in FIGS. 10 and 11) is formed as a flat face that can come in contact with the bottom face 5a of the substrate fixture 5 in the present lighting apparatus 1 according to First Embodiment.

The stepped portion 91 has a depth (i.e., a dimensional difference between a surface 91a of the stepped portion 91 and the accommodation bottom face 22 in the power-receiving accommodation chamber 21) that is not at all limited especially. The depth can, however, be smaller than a thickness of the double-sided adhesive tape 9 at least. In particular, the depth is determined by an elastic force resulting from the later-described double-sided adhesive tape 9 that is put under a compressed condition.

The double-sided adhesive tape 9 joins and/or fixes the bottom face 5a of the substrate fixture 5 in the present lighting apparatus 1 according to First Embodiment onto the accommodation bottom face 22 in the power-receiving accommodation chamber 21. The double-sided adhesive tape 9 has an adhesive face on the thickness-wise opposite faces, respectively. Moreover, the double-sided adhesive tape 9 is formed to be capable of deforming elastically in the thickness direction. In addition, the both-sided adhesive tape 9 is constructed to have opposite faces that are made of foamed resin, and on which the adhesive face is formed. Note that the both-sided adhesive tape 9 is equivalent to a later-described "joint" according to another mode of the present invention.

The double-sided adhesive tape 9 is present at an outer circumference of the through bore 24, and has an annular outer-circumferential configuration that follows or goes along the stepped portion 91. The double-sided adhesive tape 9 joins to the surface 91a of the stepped portion 91 on one of the opposite surfaces, and joins to the bottom face 5a of the substrate fixture 5 on the other one of the opposite surfaces.

Since the double-sided adhesive tape 9 has a thickness that is greater than a depth that the stepped portion 91 has, it is put in a compressed state when the present lighting apparatus 1 according to First Embodiment is assembled with the accommodation bottom face 22 in the power-receiving accommodation chamber 21. On this occasion, a stress arises in the double-sided adhesive tape 9 in such directions as the surface 91a of the stepped portion 91 and the bottom face 5a of the substrate fixture 5 are separated away from one another, namely in such directions as freeing the double-sided adhesive tape 9 from the compressed state. The resulting repulsive forces make the double-sided adhesive tape 9 demonstrate a sealing property as well between the surface 91a of the stepped portion 91 and the bottom face 5a of the substrate fixture 5. That is, the double-sided adhesive tape 9 prevents foreign materials, which try to go on from the outer side to the inner side in the radial directions, from reaching the through bore 24.

Moreover, the present lighting apparatus 1 according to First Embodiment comprises a body unit, and the power-conducting unit 45. The body unit includes the light source 41 that emits a light. The power-conducting unit 45 not only penetrates through the accommodation bottom face 22 in the power-receiving accommodation chamber 21, but also conducts electricity to energize the light source 41. In addition, the present lighting apparatus 1 further comprises the stepped portion 91 at the circumferential edge of the opening that demarcates the through bore 24 formed in the power-receiving accommodation chamber 21. The stepped portion 91 is separated away from the bottom face 5a of the substrate fixture 5. The stepped portion 91 is provided with the both-sided adhesive tape 9 that is arranged thereon in a compressed state. Moreover, around the outer circumference of the stepped portion 91, the accommodation bottom face 22 in the power-receiving accommodation chamber 21, and the bottom face 5a of the substrate fixture 5 are adhered closely one another.

That is, in the power-receiving connector 2 as described above, since the accommodation bottom face 22 in the power-receiving accommodation chamber 21 adheres closely to the bottom face 5a of the substrate fixture 5, the present lighting apparatus 1 according to First Embodiment adheres closely to the accommodation bottom face 22 in the power-receiving accommodation chamber 21 without any clearance between the bottom face 5a of the substrate fixture 5 and the accommodation bottom face 22 in the power-receiving accommodation chamber 21. In other words, foreign materials are kept from intruding into toward the power-conducting unit 45 by way of an interspace, if any, between the bottom face 5a of the substrate fixture 5 and the accommodation bottom face 22 in the power-receiving accommodation chamber 21, because the bottom face 5a adheres closely to the accommodation bottom face 22 without yielding any clearance therebetween. Even if liquids (i.e., amorphous foreign materials), such as water, should have intruded into toward the power-conducting unit 45 by way of any interspace between the bottom face 5a of the substrate fixture 5 and the accommodation bottom face 22 in the power-receiving accommodation chamber 21, the double-sided adhesive tape 9 provided on the stepped portion 91 keeps the liquids from further intruding into toward the power-conducting unit 45. As a result, the power-receiving connector 2 suppresses foreign materials from intruding into the interior of a vehicle by way of the through bore 24.

Moreover, the above-described power-receiving connector 2 comprises the accommodation bottom face 22 in the power-receiving accommodation chamber 21 that adheres closely at the outer circumference of the through bore 24 to the bottom face 5a of the substrate fixture 5. In addition, the bottom face 5a of the substrate fixture 5 adheres closely around the outer circumference to the accommodation bottom face 22 in the power-receiving accommodation chamber 21 without any clearance between the bottom face 5a and the accommodation bottom face 22. When an operator views the power-receiving accommodation chamber 21 of the thus constructed power-receiving connector 2, the present lighting apparatus 1 according to First Embodiment and the accommodation bottom face 22 are constructed so that the operator cannot visually recognize any clearance between them. Hence, the power-receiving connector 2 keeps the looks from degrading.

In addition, since the above-described power-receiving connector 2 comprises the both-sided adhesive tape 9 that is arranged on a side of the accommodation bottom face 22, an assembly operator or robot can carry out the assembly of the power-conducting unit 45 with the power-receiving connector 2 so as to fit the power-conducting unit 45 into the through bore 24. That is, the power-receiving connector 2 makes it feasible for the assembly operator or robot to do assembly operations on and from a side of the accommodation bottom face 22 in the power-receiving accommodation chamber 21, namely, on and from the outside of a vehicle. Thus, the power-receiving connector 2 upgrades the present lighting apparatus 1 according to First Embodiment in the assembly operability.

Moreover, it becomes feasible for an assembly operator or robot to assemble the present lighting apparatus 1 according to First Embodiment with the power-receiving connector 2 with the both-sided adhesive tape 9 joined on a side of the accommodation bottom face 22. In this instance, the assembly operator or robot can insert the present lighting apparatus 1 into the power-receiving connector 2 while aiming at the both-sided adhesive tape 9 serving as a target. Thus, the double-sided adhesive tape 9 upgrades the present lighting apparatus 1 more in the assembly operability.

In addition, the above-described power-receiving connector 2 comprises the stepped portion 91 that is formed in the accommodation bottom face 22 in the power-receiving accommodation chamber 21. The thus constructed power-receiving connector 2 allows an assembly operator or robot to use the stepped portion 91 as a target position for bonding the double-sided adhesive tape 9 when bonding the double-sided adhesive tape 9 toward the accommodation bottom face 22. Thus, the stepped portion 91 upgrades the present lighting apparatus 1 much more in the assembly operability.

Moreover, in the above-described power-receiving connector 2, an annular shape is formed by the stepped portion 91 and the closely-adhered portion or joint in which the accommodation bottom face 21 is closely adhered to the present lighting apparatus 1 according to First Embodiment. Since the thus constructed power-receiving connector 2 comprises the stepped portion 91 and closely-adhered portion or joint that form an annular shape, no clearance comes to arise over the entire circumference between the accommodation bottom face 22 in the power-receiving accommodation chamber 21 and the bottom face 5a of the substrate fixture 5 in the present lighting apparatus 1. Thus, the power-receiving connector 2 securely suppresses foreign materials from intruding into the interior of a vehicle by way of the through bore 24.

In addition, the above-described power-receiving connector 2 comprises the power-receiving accommodation chamber 21 that is screwed together with the substrate fixture by the screws (53,53) penetrating through the screw insertion holes (51, 51). The thus constructed power-receiving connector 2 comprises the power-receiving accommodation chamber 21 to which the present lighting apparatus 1 according to First Embodiment is fixed reliably via the substrate fixture 5. Moreover, the power-receiving connector 2 enables the accommodation bottom face 22 in the power-receiving accommodation chamber 21 and the bottom face 5a of the substrate fixture 5 in the present lighting apparatus 1 to adhere closely one another at around the outer circumference of the stepped portion 91. Note that a "locking portion" described below is equivalent to the construction including the substrate fixture 5 locked together with the power-receiving accommodation chamber 21 by screws (53, 53). In addition, a "screwed member" described below is equivalent to the screws (53, 53).

Although the present lighting apparatus 1 according to First Embodiment has been described so far as one of suitable embodiments according to the present invention, the present invention is not at all limited to First Embodiment in particular. For example, First Embodiment does not all restrict the following especially: the method of fixing the substrate 4 onto the substrate fixture 5; and the method of installing the present lighting apparatus 1.

Moreover, although the present lighting apparatus 1 according to First Embodiment comprises the cover side face 11b including the light emission face 61 that is provided at the lower end on the circumferential edge, the same advantages as those described above in First Embodiment are obtainable even when the cover side face 11b includes the light emission face 61 that is provided over the entire circumference. Besides, the second emission section 61b, the first emission section 61a, and the second emission section 61c cannot necessarily be continuous with each other.

In addition, the present lighting apparatus 1 according to First Embodiment comprises the light emission face 61 that transmits a light coming from the light source 41 therethrough or diffuses the light thereinto illuminate on a side of the power-receiving unit 3 and on a side of an operator's feet. Instead of the thus constructed light emission face 61, it is also allowable to construct the light emission face 61 to emit a light of itself, without providing the present lighting apparatus 1 with the light source 41. For example, it is even permissible to construct embodiments as follows: building a light source into the light transmitting member 6 that is equivalent or corresponds to the light emission face 61; or providing the light transmitting member 6, which is equivalent or corresponds to the light emission face 61, with a light guiding body inside the light transmitting member 6, and leading through the light guiding body a light coming from a light source, which is provided at the other site, to make the light emission face 61 emit a light.

Moreover, the present lighting apparatus 1 according to First Embodiment includes the lower-end horizontal section 14 that is arranged horizontally to the right/left direction. The lower-end horizontal section 14, however, can incline slightly in a desired direction. For example, when it is desired to irradiate with a light more on a side of the first power-receiving subunit 31, the lower-end horizontal section 14 can also incline slightly downward from the left-hand side to the right-hand side. In this case, the first inclination section 15 and the second inclination section 16 are not arranged symmetric linearly with one another.

In addition, the present lighting apparatus 1 according to First Embodiment may include the accommodation bottom face 22 formed as a bent or a curved face that includes a first bottom face and a second bottom face. The first bottom face and second bottom face are arranged to cross one another. If such is the case, the power-receiving unit 3 is arranged in the first bottom face, whereas the present lighting apparatus 1 is arranged in the second bottom face. For example, such an accommodation bottom face 22 can include a substantially-horizontal first bottom face and a substantially-vertical second bottom face. The accommodation bottom face 22 may be disposed within an engine room and below an engine room cover.

Figure 15:
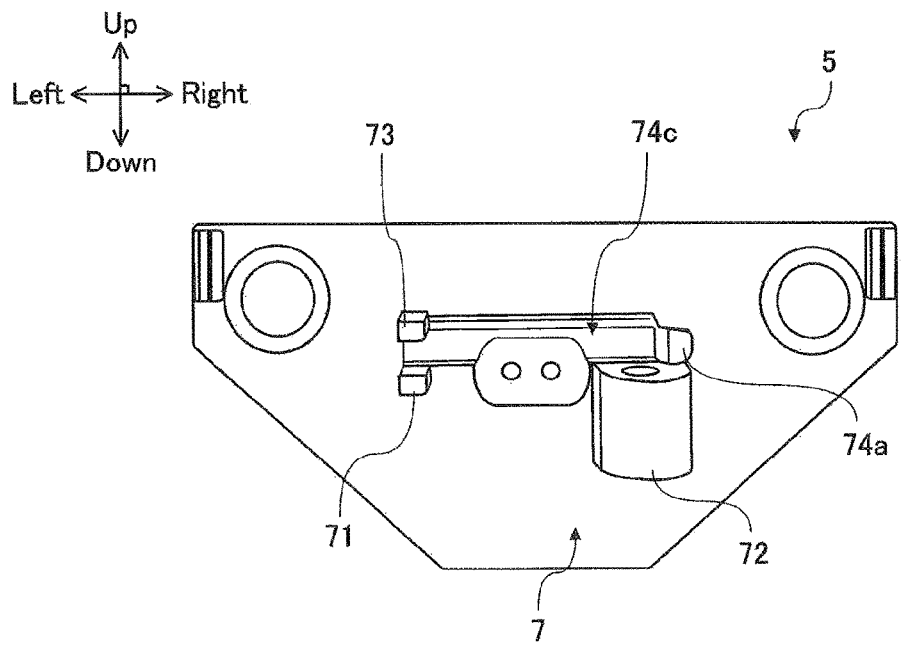
FIG. 15 is an explanatory diagram for schematically illustrating another form of the substrate fixture 5.

Moreover, the present lighting apparatus 1 according to First Embodiment comprises the substrate fixture 5 including the retaining portion 7 that is provided with the positioning section 74 including the first positioning subsection 74a, second positioning subsection 74b and third positioning dent 74. However, the positioning section 74 can include, without the second positioning subsection 74b, the first positioning subsection 74a and third positioning dent 74c alone, as shown in FIG. 15. Even such a positioning section 74 can inhibit the substrate 4 from suffering from drawbacks, such as being broken down or being displaced or misaligned out of position, which result from vibrations when a vehicle is traveling. In addition, even when the present lighting apparatus 1 comprises the substrate fixture 5 including the retaining portion 7 that only includes the first positioning subsection 74a and second positioning subsection 74b but is free of the third positioning dent 74c, it is possible to inhibit the vibrations of the traveling vehicle from resulting in the breakdown and displacement or positional misalignment of the substrate 4.

In addition, the present lighting apparatus 1 according to First Embodiment comprises the light transmitting member 6 whose opposite ends are welded over the entire circumference to the substrate fixture 5 for the purpose of water shut-off or waterproofing. A similar water shut-off or waterproof effect can, however, be expected by substituting for the weldment a member, like a washer or packing made of rubber, for instance, which interposes between the substrate fixture 5 and the light transmitting member 6 that is in contact with the substrate fixture 5 at the opposite ends all around the circumference. The thus constructed present lighting apparatus 1 makes it feasible to expose the substrate 4 more easily at the time of replacing the substrate 4, for instance.

Moreover, the present lighting apparatus 1 according to First Embodiment comprises the accommodation bottom face 22 in the power-receiving accommodation chamber 21 in which the stepped portion 91 is formed. The present lighting apparatus 1, however, can comprise the substrate fixture 5 that is provided with the stepped portion 91. In such an embodiment, since the accommodation bottom face 22 in the power-receiving accommodation chamber 21 and the bottom face 5a of the substrate fixture 5 are only constructed in an inversed manner to those in First Embodiment, a superb advantageous effect can also be demonstrated likewise in the water shut-off or waterproofing property between a light source (i.e., the present lighting apparatus 1) and a decorative cover (i.e., the power-receiving accommodation chamber 21) on which the light source is fixed. That is it is possible to provide the stepped portion 91 for at least one of the opposing faces (22, 5a) in the power-receiving accommodation chamber 21 and substrate fixture 5.

In addition, the present lighting apparatus 1 according to First Embodiment comprises the screws (53, 53) that are used as a means for assembling the substrate fixture 5 with the accommodation bottom face 22 in the power-receiving accommodation chamber 21. The substrate fixture 5 can, however, be fixed to the accommodation bottom face 22 by other methods. For example, it is also allowable to use a clipping member that urges the substrate fixture 5 onto the accommodation bottom face 22, or that retains the substrate fixture 5 onto the accommodation bottom face 22 in a press contact state.

Incidentally, conventional lighting apparatuses for power-receiving connector might possibly have been heretofore associated with such other problems as described below.

For example, a lighting unit disclosed in Japanese Patent Gazette No. 5684600 is a lighting apparatus for power-receiving-side connector, and is disposed adjacent to a charging port so as to illuminate the charging port. In the lighting unit, a substrate including a light source is fastened onto a decorative cover that covers structures inside a vehicle. Note that the substrate is inserted into the decorative cover through the rear face side, namely, through the vehicular inner side, so as to project from the decorative cover. That is, the substrate is fixed in a so-called cantilevered manner so as to be parallel to the directions of connecting and disconnecting the power-receiving-side connector.

When the lighting unit includes the substrate that is fastened in a so-called cantilevered manner, and if the substrate is not fixed sufficiently, vibrations, which occur during the traveling of a vehicle, might possibly result in such a fear as breaking down the light source with which the substrate is provided, or breaking down circuit elements on the substrate, for instance. Moreover, when vibrations at the time of installing the substrate, or vibrations occurring during the traveling of a vehicle, result in displacing or misaligning the substrate out of position, such a fear might possibly arise as the light source cannot illuminate the charging port fully, because positional displacements or misalignments of the light source arise, accompanied by the substrate that has been displaced or misaligned out of position.

In view of the aforementioned circumstances, it is therefore another object of the present invention to provide a lighting apparatus for power-receiving connector, lighting apparatus which can inhibit breakages and positional displacements or misalignments of the substrate that result from vibrations occurring when a vehicle is traveling. A lighting apparatus for power-receiving connector according to one of the other aspects of the present invention has been developed to achieve the objective, and is constructed as hereinafter described.

(1-1) For example, the present lighting apparatus for power-receiving connector according to the one of the other aspects of the present invention makes a lighting apparatus disposed on a vehicle-side power-receiving connector for charging an on-board battery of a vehicle to illuminate a power-receiving unit to be connected to a power-feeding connector coming from an outside thereof, and the lighting apparatus comprises:

a substrate including a light source;

a substrate fixture including a retaining portion that retains the substrate at one of opposite ends thereof in a cantilevered manner;

a lighting cover covering the substrate and the substrate fixture, and including a light emission face through which a light coming from the light source transmits;

the retaining portion including: a substrate seat on which the substrate is placed at one of opposite ends thereof on one of opposite end sides thereof; a fixture seat on which the substrate is placed at the one of the opposite ends on another one of the opposite end sides; a substrate retainer opposing the substrate seat with the substrate intervening therebetween and holding, together with the substrate seat, the one of the opposite end sides of the substrate placed on the substrate seat therebetween; and a fixing member fixing, onto the fixture seat, the one of the opposite end sides of the substrate placed on the substrate seat.

The present lighting apparatus according to the one of the other aspects of the present invention employing the above-described construction comprises the substrate fixture including the retaining portion that retains the substrate at one of the opposite ends in a cantilevered manner. The retaining portion includes the substrate seat, the fixture seat, the substrate retainer, and the fixing member. Of one of the opposite ends, the substrate is placed at one of the opposite end sides on the substrate seat. Of the one of the opposite ends, the substrate is placed on the fixture seat at another one of the opposite end sides. The substrate seat holds, together with the substrate retainer, the substrate by the one of the opposite end sides. The fixture seat fixes, with the fixing member, the substrate by another one of the opposite end sides.

The thus constructed present lighting apparatus according to the one of the other aspects of the present invention can firmly fasten the substrate at the opposite ends on the both sides, namely, on both of the one of the opposite end sides and the other one of the opposite end sides. Therefore, the present lighting apparatus can inhibit vibrations, which occur when a vehicle is running, from resulting in displacing or misaligning the substrate out of position, and in breaking it down. Moreover, the present lighting apparatus can inhibit, with the substrate retainer, the substrate from popping up on the one of the opposite end sides (i.e., on the free-end side), popping up which might possibly be likely to occur when the substrate is fixed by a fixing member such as screws, for instance, on the other one of the opposite end sides (i.e., on the fixed-end side). Hence, the present lighting apparatus can inhibit the substrate from being displaced or misaligned out of position, displacement or misalignment which might possibly be likely to occur at the time of assembling the substrate.

All in all, the present lighting apparatus according to the one of the other aspects of the present invention can inhibit the substrate including the light source from being displaced or misaligned out of position and from being broken down even when it is subjected to vibrations that occur during the traveling of a vehicle, or during the assemblage.

Moreover, when the present lighting apparatus according to the one of the other aspects of the present invention is modified as hereinafter described, it is possible to inhibit the substrate including a light source from being positionally displaced or misaligned that results from the vibrations occurring when a vehicle is running, or to inhibit the substrate and light source from being broken down when being assembled.

(1-2) The present lighting apparatus according to the one of the other aspects of the present invention as set forth in (1-1) above, wherein the substrate fixture includes a positioning portion determining a fixing position for the substrate in a direction crossing perpendicularly a plate thickness-wise direction of the substrate.

(1-3) The present lighting apparatus according to the one of the other aspects of the present invention as set forth in (1-1) above, wherein the power-receiving unit includes a first power-receiving subunit for AC power source and a second power-receiving subunit for DC power source that are placed collaterally to one another;

a light coming from the light source illuminates the first power-receiving subunit, and the second power-receiving subunit; and the substrate seat is disposed on a side of the first power-receiving subunit, and the fixture seat being greater than the substrate seat is disposed on a side of the second power-receiving subunit, in order to make the light illuminate the first power-receiving subunit more than the second power-receiving subunit.

Incidentally, conventional power-receiving connectors (hereinafter being also referred to as charging apparatuses) might possibly have been heretofore associated with such still other problems as described below.

In apparatuses, like vehicles, which are employed outdoors, a mechanism for preventing rainwater from intruding into the inside has been sought for. For example, the lighting apparatus disclosed in Japanese Patent Gazette No. 5684600 comprises such a water shut-off or waterproof structure for the light source itself that stops water, which tries to intrude into the interior by way of a harness, with a packing. Japanese Patent Gazette No. 5684600, however, only discloses the water shut-off or waterproof structure for the light source itself, but does not at all suggest any structure for shutting water off or waterproofing between the light source and a decorative cover.

It has been carried out commonly to interpose a sealing member having a cushioning property between a light source and a decorative cover, as a water shut-off or waterproofing structure between them. In particular, in a lighting apparatus comprising a light source that is placed on a surface of a decorative cover, a sealing member has been placed on a surface of the decorative cover, and then the light source has been placed on a surface of the sealing member.

In the water shut-off or waterproof structure comprising the sealing member interposed between the light source and the decorative cover, water pressures has been applied directly to the sealing member, because the sealing member is exposed. If such is the case, degradations of the sealing member itself have been facilitated. Moreover, clearances occur between the light source and the decorative member by a thickness of the sealing member so that the resulting assembly has deteriorated in the looks. In addition, it has been often the case that the sealing member has an annular shape in order to establish the water shut-off or waterproof structure. Such a configuration, however, has been associated with a problem of poor assemblabiliy (i.e., workability during the application or adhesion).

In view of the aforementioned circumstances, it is therefore still another object of the present invention to upgrade the water shut-off or waterproofing property between a light source (i.e., a lighting apparatus for power-receiving connector) and a decorative cover (i.e., a power-receiving accommodation chamber) on which the light source is fixed. Another mode of the pre sent invention, which leads to achieving the still other object, will be hereinafter described.

(2-1) For example, a charging apparatus (i.e., a power-receiving connector) according to the other mode of the present invention comprises:

a power-receiving accommodation chamber including a through bore, and a power-receiving unit to be connected to a fit-in plug (i.e., a power-feeding connector) connected with an external power source;

a lighting unit disposed in the power-receiving accommodation chamber, and illuminating the power-receiving unit with a light; and a joint including a double-sided adhesive tape for joining and/or fixing the lighting unit onto the power-receiving accommodation chamber;

the lighting unit including a body section having a light-emitting subunit for emitting the light, and a power-conducting subunit not only penetrating through the through bore in the power-receiving accommodation chamber but also flowing electricity for energizing the light-emitting subunit;

the power-receiving accommodation chamber and the lighting unit having opposing faces, respectively, at least one of the opposing faces which is provided with a stepped portion disposed to separate away from the other one of the opposing faces at an outer circumference of the through bore through which the power-conducting subunit penetrates; and the double-sided adhesive tape being arranged on the stepped portion in a compressed state in conjunction with the power-receiving accommodation chamber and the lighting unit adhering one another closely at an outer circumference of the stepped portion.

The thus constructed charging apparatus (i.e., power-receiving connector) according to the other mode of the present invention comprises the power-receiving accommodation chamber including the power-receiving unit to be connected to the fit-in plug (i.e., a power-feeding connector), and the lighting unit (i.e., alighting apparatus for power-receiving connector) that is disposed in the power-receiving accommodation chamber to illuminate the power-receiving unit. Consequently, it is possible for an operator to illuminate the power-receiving unit, as well as to visually recognize a fit-in position for the power-receiving unit with ease.

The thus constructed charging apparatus (i.e., a power-receiving connector) according to the other mode of the present invention comprises the power-receiving accommodation chamber and lighting unit having opposing faces, at least one of the opposing faces which is provided with a stepped portion. Moreover, the stepped portion is disposed to separate away from the other one of the opposing faces at an outer circumference of the through bore through which the power-conducting subunit penetrates. In addition, not only the double-sided adhesive tape of the joint is arranged on the stepped portion in a compressed state, but also the power-receiving accommodation chamber and the lighting unit adhere one another closely at an outer circumference of the stepped portion. Since the power-receiving accommodation chamber and the lighting unit adhere one another closely at an outer circumference of the stepped portion, no clearance arises between the power-receiving accommodation chamber and the lighting unit. Hence, the charging apparatus (i.e., a power-receiving connector) according to the other mode of the present invention suppresses foreign materials from intruding into toward the through bore and power-conducting subunit.

In addition to the above, since the charging apparatus (i.e., a power-receiving connector) according to the other mode of the present invention comprises the double-sided adhesive tape that is arranged on the stepped portion in a compressed state, the double-sided adhesive tape further suppresses the intrusion of liquids (i.e., amorphous foreign materials) or fine foreign materials even when the liquids or fine foreign material should have intruded into by way of any interspace between the power-receiving accommodation chamber and the lighting unit. As a result, the charging apparatus (i.e., a power-receiving connector) according to the other mode of the present invention constructed as described above demonstrates an advantageous effect of suppressing any foreign materials from intruding into the interior of its own by way of the through bore.

Moreover, since the thus constructed charging apparatus (i.e., a power-receiving connector) according to the other mode of the present invention comprises the power-receiving accommodation chamber and lighting unit that adhere one another closely at an outer circumference of the stepped portion, no clearance arises between the power-receiving accommodation chamber and the lighting unit. When the lighting unit of the thus constructed charging apparatus according to the other mode of the present invention is viewed, the charging apparatus has such an advantageous construction that no clearance can be recognized visually between the lighting unit and the power-receiving accommodation chamber. Thus, the charging apparatus according to the other mode of the present invention keeps the looks from degrading.

The charging apparatus (i.e., a power-receiving connector) according to the other mode of the present invention constructed as described above further comprises the stepped portion. The stepped portion makes a target for bonding the double-sided adhesive tape at a predetermined position when an assembly operator applies the double-sided adhesive tape. Therefore, the charging apparatus further comprising the stepped portion enables the assembly operator to assemble a lighting apparatus for power-receiving connector with upgraded assemblage operability, even when the joint is formed as an annular shape, namely, even when the double-sided adhesive tape has an annular shape.

In addition, it is possible to furthermore upgrade the water shut-off or waterproofing property between a light source (i.e., a lighting apparatus for power-receiving connector) and a decorative cover on which the light source is fixed, when the charging apparatus (i.e., a power-receiving connector) according to the other mode of the present invention is modified as hereinafter described.

(2-2) The charging apparatus according to the other mode of the present invention as set forth in (2-1) above, wherein the stepped portion is disposed in the power-receiving accommodation chamber.

(2-3) The charging apparatus according to the other mode of the present invention as set forth in (2-1) above, wherein the stepped portion, and a close-adherence portion, where the power-receiving accommodation chamber and the lighting unit adhere closely one another, form an annular shape.

(2-4) The charging apparatus according to the other mode of the present invention as set forth in (2-1) above further comprising a locking portion that makes the lighting unit press contact with the power-receiving accommodation chamber by locking.

(2-5) The charging apparatus according to the other mode of the present invention as set forth in (2-4), wherein the locking portion includes at least one member selected from the group consisting of screwed members and clipping members that lock the lighting unit with the power-receiving accommodation chamber.

(2-6) The charging apparatus according to the other mode of the present invention as set forth in (2-1) above, wherein the lighting unit is attached by welding onto the power-receiving accommodation chamber.

(2-7) The charging apparatus according to the other mode of the present invention as set forth in (2-1) above making a charging apparatus for vehicle.

Having now fully described the present invention, it will be apparent to one of ordinary skill in the art that many changes and modifications can be made thereto without departing from the spirit or scope of the present invention as set forth herein including the appended claims.

What is claimed is:

1. A lighting apparatus for a power-receiving connector, the power-receiving connector including:

a power-receiving accommodation chamber including an accommodation bottom surface for placement in a vehicular outer face; and a power-receiving unit disposed on the accommodation bottom surface to be connected to a power-feeding connector, the lighting apparatus being disposed on the accommodation bottom surface of the power-receiving connector, and comprising:

a lighting cover including a cover top face opposing the accommodation bottom surface, and a cover side face disposed between the accommodation bottom surface and the cover top face, the cover side face including a light emission face through which light emits to illuminate the power-receiving unit, and being inclined so as to overhang from the cover top face toward the accommodation bottom surface, the light emission face including a first emission portion directed to a vehicular lower side, and a second emission portion directed to a vehicular lateral side, the first emission portion exhibiting a first elevation angle relative to the accommodation bottom surface, the second emission portion exhibiting a second elevation angle relative to the accommodation bottom surface, and the first elevation angle being smaller than the second elevation angle.

2. The lighting apparatus according to claim 1, wherein a ratio of the second elevation angle to the first elevation angle falls in a range of from 1.05 to 1.20.

3. The lighting apparatus according to claim 1, further comprising a light source disposed within the lighting cover, wherein light coming from the light source transmits through the light emission face.

4. The lighting apparatus according to claim 1, wherein, when viewed from a charging operation position for a charging operation is labeled a front-face operational position as "P2," and viewed from the charging operation position the cover top face on the front side is labeled a front-face central position as "P1," the front-face central position "P1" and the front-face operational position "P2" are disposed such that the front-face central position "P1" is projected onto the accommodation bottom surface at a lower position than a position that the front-face operational position "P2" is projected.

5. The lighting apparatus according to claim 1, wherein the light emission face further includes another second emission portion directed to another vehicular lateral side.

6. The lighting apparatus according to claim 5, wherein the second emission portion and said another second emission portion are arranged symmetrically with respect to the first emission portion.

7. The lighting apparatus according to claim 5, wherein the second emission portion and said another second emission portion respectively have a linearly symmetric configuration with one another to an imaginary line that elongates in an up/down direction thereof.

8. The lighting apparatus according to claim 1, wherein the first emission portion exhibits a first protrusion magnitude from the light emission face to the accommodation bottom surface in a direction parallel to an up/down direction of the accommodation bottom surface, wherein the second emission portion exhibits a second protrusion magnitude from the light emission face to the accommodation bottom surface in a direction parallel to an up/down direction of the accommodation bottom surface, and wherein the first protrusion magnitude is greater than the second protrusion magnitude by a ratio falling in a range of from 1.4 to 1.8.

* * * * *